(12) United States Patent
Asai et al.

(10) Patent No.: US 7,303,207 B2
(45) Date of Patent: Dec. 4, 2007

(54) AIRBAG

(75) Inventors: Masako Asai, Aichi-ken (JP); Yasushi Okada, Aichi-ken (JP); Tatsuo Hirano, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 237 days.

(21) Appl. No.: 11/212,123

(22) Filed: Aug. 26, 2005

(65) Prior Publication Data
US 2006/0043709 A1 Mar. 2, 2006

(30) Foreign Application Priority Data
Aug. 31, 2004 (JP) ............... 2004-253168
Mar. 29, 2005 (JP) ............... 2005-095906

(51) Int. Cl.
*B60R 21/30* (2006.01)
*B60R 21/16* (2006.01)
(52) U.S. Cl. ............... 280/738; 280/739; 280/743.1
(58) Field of Classification Search ............ 280/738, 280/739, 742, 743.1
See application file for complete search history.

(56) References Cited

U.S. PATENT DOCUMENTS

| | | | | |
|---|---|---|---|---|
| 3,888,505 A | * | 6/1975 | Shibamoto | 280/738 |
| 3,907,327 A | | 9/1975 | Pech | |
| 4,043,572 A | * | 8/1977 | Hattori et al. | 280/738 |
| 5,542,695 A | * | 8/1996 | Hanson | 280/729 |
| 5,772,238 A | * | 6/1998 | Breed et al. | 280/728.2 |
| 5,918,902 A | * | 7/1999 | Acker et al. | 280/743.1 |
| 6,848,714 B2 | * | 2/2005 | Varcus | 280/743.1 |
| 7,118,127 B2 | * | 10/2006 | Damm | 280/739 |

FOREIGN PATENT DOCUMENTS

JP B2-3467271 8/2003

* cited by examiner

*Primary Examiner*—Paul N. Dickson
*Assistant Examiner*—Joseph Rocca
(74) *Attorney, Agent, or Firm*—Posz Law Group, PLC

(57) ABSTRACT

The airbag includes a bag-shaped circumferential wall formed of base cloths, and a lap portion. In the lap portion, a terminal portion of a downstream side base cloth, which is located in downstream of inflation gas, is superposed on a terminal portion of an upstream side base cloth, which is located in upstream of inflation gas. Then the lapping terminal portions are joined to each other at both sides thereof in a direction extending along edges of the terminal portions, thereby providing the lap portion. A communication port communicating inside and outside of the airbag is provided between the joined portions and between the terminal portions of the upstream and the downstream side base cloths. With this construction, in the course of airbag inflation, inflation gas flowing toward the downstream side base cloth from the upstream side base cloth sucks air into the airbag from outside via the communication port, and when the airbag bumps against a target object of protection halfway of inflation, inflation gas is exhausted out of the airbag via the communication port. Moreover, when the airbag is completely inflated, the communication port is closed with the terminal portions contacted with each other. The airbag of the present invention suppresses increase of internal pressure upon engaging a target object of protection halfway of inflation, as well as completing inflation swiftly.

12 Claims, 31 Drawing Sheets

AIRBAG

The present application claims priority from Japanese Patent Application No. 2004-253168 of Asai et al., filed on Aug. 31, 2004, and Japanese Patent Application No. 2005-095906 of Asai et al., filed on Mar. 29, 2005, the disclosures of which are hereby incorporated into the present application by reference.

BACKGROUND OF THE INVENTION

1. Field of the Invention

The present invention relates to an airbag used for an airbag device mountable on vehicle. This airbag deploys from folded and housed state upon inflow of inflation gas. The airbag comes in contact with and protects a target object of protection with its cushioning property.

2. Description of Related Art

In the prior art, Japanese Patent No. 3467271 and U.S. Pat. No. 3,907,327 disclose airbags which utilize not only inflation gas from an inflator but also air to complete inflation. These airbags swiftly complete inflation by introducing air into predetermined interior chambers thereof while developing a circumferential wall thereof.

Although these airbags are capable of inflating swiftly utilizing air from the atmosphere as well as inflation gas, there is a room for improvement in reducing pressure applied to a target object of protection, such as a passenger or a pedestrian, when the airbags are thrown against the same halfway of inflation, before completion of inflation.

SUMMARY OF THE INVENTION

The present invention contemplates to solve the above-mentioned problem, and has an object to provide an airbag capable of suppressing increase of its internal pressure when bumping against the target object of protection halfway of inflation, as well as completing inflation swiftly.

The airbag of the present invention is employed as part of an airbag device mountable on vehicle, and develops and inflates with inflation gas from folded and housed state for protecting a target object of protection with its cushioning property when contacting with the same. The airbag includes a bag-shaped circumferential wall, an upstream side base cloth as part of the circumferential wall, located in upstream side of inflation gas, and a downstream side base cloth also as part of the circumferential wall, located in downstream side of inflation gas. The airbag further includes a lap portion. The lap portion is formed by superposing a terminal portion of the downstream side base cloth on a terminal portion of the upstream side base cloth, and by joining the terminal portions to each other at both ends of the terminal portions in a direction extending along edges of the terminal portions, such that the terminal portion of the upstream side base cloth is masked from surface of the airbag. The lap portion includes a communication port between joined portions of the upstream side base cloth and the downstream side base cloth and between the terminal portions of the upstream and downstream side base cloths, the port communicating inside and outside of the airbag. With this construction of the lap portion, in the course of unfolding and inflation of the airbag, the inflation gas flowing toward the downstream side base cloth from the upstream side base cloth in the lap portion sucks air into the airbag from outside via the communication port, and when the airbag bumps against the target object of protection halfway of inflation, inflation gas is exhausted out of the airbag via the communication port. Moreover, when the airbag is completely inflated, the communication port is closed with the terminal portions of the upstream side and downstream side base cloths contacted with each other.

In the course of unfolding and inflation of the airbag of the present invention, because of ejector action caused by inflation gas flowing from the upstream side base cloth to the downstream side base cloth in the lap portion, air is sucked into the airbag from outside via the communication port in the lap portion. Accordingly, the airbag inflates quickly by inflation gas and air.

When the airbag completes inflation, internal pressure of the airbag brings about uniform tension in the entire circumferential wall of the airbag. Because of this tension, in the lap portion, the terminal portion of the downstream side base cloth comes into contact with surface of the terminal portion of the upstream side base cloth with no gaps. Affected by internal pressure of the airbag as well, the communication port is closed to suppress exhaustion of inflation gas therefrom. As a result, the airbag protects the target object of protection with its cushioning property.

When engaging a target object of protection halfway of inflation, the internal pressure of the airbag slightly increases, and stream of inflation gas is stagnated. Then the air stops flowing in the airbag, and inflation gas is exhausted from the communication port kept open. Consequently, increase of internal pressure is suppressed when engaging the target object of protection halfway of inflation, so that the airbag of the present invention does not apply unnecessary pressure to the target object of protection.

The inflow and exhaustion of inflation gas via the communication port, and the closure of the communication port are realized by adjusting a lap amount of the terminal portions of the upstream and downstream side base cloths, a distance between the joined portions, and so on. That is, the inflow and exhaustion of inflation gas via the communication port, and the closure of the communication port are made to occur only by utilizing the base cloths as constituent parts of the circumferential wall of the airbag, without utilizing an additional valve mechanism.

Therefore, the airbag completes inflation quickly, and suppresses increase of internal pressure when engaging a target object of protection halfway of inflation.

The lap portion is desirably located in a position of the airbag apart from an area to contact with a target object of protection. With this construction, the communication port in the lap portion is not closed by the target object even if the airbag engages the target object halfway of inflation, so that exhaustion of inflation as is not hindered. Consequently, even if the airbag engages the target object halfway of inflation, the increase of internal pressure of the airbag is smoothly suppressed.

If a recipient wall of the airbag to contact with the target object of protection for protecting the same upon airbag inflation is located in an end face of the circumferential wall which is in a stream terminal of inflation gas, it is desired that the lap portion is located in a portion of the airbag circumferential wall in upperstream side of inflation gas than an outer circumference of the recipient wall, and that each of the edges of the terminal portions of the upstream and the downstream side base cloths is arranged generally in parallel with a plane of the recipient wall in an airbag's completely inflated condition.

That is, in order to exhaust inflation gas, the communication port desirably opens by separation of center portions of the edges of the terminal portions of the upstream and downstream side base cloths between the joined portions of the lap portion. With above construction, when the recipient wall located in stream terminal of inflation gas engages the target object halfway of inflation and unfolding of the airbag, a dent of the recipient wall causes partial tension force in a wall portion where the lap portion is located, the tension force working in perpendicular to a plane of the recipient wall. This direction of the tension force is generally perpendicular to the edges of the terminal portions of the upstream and downstream side base cloths, i.e., is generally consistent with a separating direction of the center portions of the edges. Accordingly, an open state of the communication port is stably maintained, so that inflation gas is smoothly exhausted from the communication port.

If the airbag includes an inlet port for inflation gas which is a stream origin of inflation gas, the airbag may also include a flow regulating cloth for redirecting inflation gas flown in the airbag from the inlet port such that inflation gas flows toward the downstream side base cloth from the upstream side base cloth in the lap portion.

With this construction, the flow regulating cloth helps enhance the ejector action caused by inflation gas flowing from the upstream side base cloth toward the downstream side base cloth. Consequently, the airbag admits air from the atmosphere via the communication port in the lap portion even more swiftly.

If the airbag is employed in an airbag device for front passenger's seat mountable in an instrument panel in front of front passenger's seat, for protecting a front passenger as target object of protection, the airbag is desirably constructed as follows: the airbag includes a passenger side wall and a cylindrical wall. The passenger side wall is deployed generally vertically at rear side of the airbag upon airbag inflation, and is thrown against the passenger for protecting the same. The cylindrical wall is deployed between a front wind shield and a top face of the instrument panel upon airbag inflation, in a manner converging forward from outer circumference of the passenger side wall. The cylindrical wall has the inlet port for inflation gas in the vicinity of front end of its lower wall. Moreover, each of the edges of the terminal portions of the upstream and the downstream side base cloths is arranged in generally left-right direction of the airbag completely inflated. The edge of the terminal portion of the downstream side base cloth is located forward of the edge of the terminal portion of the upstream side base cloth, and the lap portion is located in a portion to contact the wind shield in an upper wall of the cylindrical wall.

With this construction, when the airbag is completely inflated, the lap portion contacts the wind shield and is held down by the wind shield. As a result, the communication port is stably closed with the terminal portions of the upstream and downstream side base cloths attached to each other, because of internal pressure of the airbag, too. Therefore, the airbag stably prevents leakage of inflation gas from the communication port when completely inflated.

Moreover, in the lap portion, the edges of the terminal portions of the upstream and downstream side base cloths are disposed along generally left-right direction of the airbag as completely inflated. The edge of the terminal portion of the downstream side base cloth is located forward of the edge of the terminal portion of the upstream side base cloth. Accordingly, if the airbag engages a passenger positioned close-by the airbag halfway of inflation, when still not contacting the wind shield, partial tension force occurs in the upper wall where the lap portion is located. This tension force works in front-rear direction, which is generally perpendicular to the edges of the terminal portions of the upstream and downstream side base cloths. That is, the tension force serves to keep the communication port open. In other words, the working direction of the tension force is generally consistent with a separating direction of the center portions of the edges. Accordingly, an open state of the communication port is stably maintained, so that inflation gas is smoothly exhausted from the communication port.

In a folding process of the airbag, if a lower edge vicinity part of the passenger side wall is roll-folded toward the inlet port in a lower side of the lower wall of the cylindrical wall, following working effects are obtained. Unfolding of the roll-folded portion is subjected to more resistance than unfolding of bellows-folding. In addition, the lap portion is located in the upper wall apart from the lower wall where the roll-folded portion is located. Accordingly, during inflation of the airbag accompanied by the unfolding of the roll-folding, the tension force working in front-rear direction is more likely to occur in the upper wall. This working direction of the tension force is consistent with a separating direction of the center portions of the edges in the terminal portions of the upstream and downstream side base cloths, i.e., a direction to keep the communication port open. Consequently, the airbag stabilizes the open state of the communication port from the beginning to completion of the unfolding, or from the beginning to completion of airbag inflation. Therefore, the airbag stably secures inflow of the air thereinto in the course of inflation, and exhaustion of inflation gas upon engaging a target object of protection halfway of inflation.

This open state of the communication port differs from the open state of the same in a case that the airbag engages a target object of protection halfway of inflation. That is, a lap amount of the terminal portions of the upstream and downstream side base cloths in the lap portion is so predetermined that the ejector action may be caused when inflation gas flows along the upstream side base cloth and then along the downstream side base cloth in order for the air to be sucked into the airbag via the communication port. This arrangement maintains a generally uniform open state of the communication port from the beginning to completion of the unfolding of the airbag. Therefore, in the normal deployment process, the airbag does not allow inflation gas to flow out of the communication port. In contrast, when the airbag engages a target object of protection halfway of inflation, flow of inflation gas is stopped, and the ejector action to suck in the air is stopped, too so that the airbag allows inflation gas to flow out of the communication port.

It is desired that the edges of the terminal portions of the upstream and downstream side base cloths in the lap portion extend along generally left-right direction of the airbag as completely inflated, up to the vicinity of left and right edges of the upper wall extending downward.

With this construction, although the communication port is opened widely with the centers of the edges of the terminal portions separated in front-rear direction for introducing the air into the airbag during airbag inflation, the airbag is able to close the port smoothly right before completion of airbag inflation.

More specifically, as a tension force starts to be generated in the whole circumferential wall of the airbag right before completion of airbag inflation, a tension force working in left-right direction is applied, too, to marginal portions of the communication port which had been separated in front-rear direction. This tension force in left-right direction works such that the terminal portion of the downstream side base cloth caps, or covers over the terminal portion of the upstream side base cloth, thereby closing the communication port. At this time, the left and right joined portions of the downstream and upstream side base cloths in the lap portion are disposed in the vicinity of the left and right edges of the upper wall, respectively, while the terminal portions of the downstream and upstream side base cloths have a curved shape as part of a generally spherical shell. In addition, the terminal portion of the downstream side base cloth is mounted around the terminal portion of the upstream side base cloth. This construction produces the tension force working in left-right direction in the marginal portions of the communication port. Accordingly, when the communication port is closed, the terminal portion of the downstream side base cloth rotates forward around the left and right joined portions and covers the terminal portion of the upstream side base cloth. As a result, the communication port is smoothly closed.

It will also be appreciated that the lap portion includes two joined portions in each of left and right sides thereof in a direction extending along the edges of the terminal portions of the upstream and downstream side base cloths, and that the two joined portions are arranged side by side in generally left-right direction. This construction helps improve strength of the joined portions in the lap portion. Accordingly, when receiving a target object of protection or a passenger having high kinetic energy after being completely inflated, for instance, even if the inner joined portions are broken, the airbag maintains the joined state of the upstream and downstream side base cloths by the outer joined portions. As a result, the airbag prevents gas leakage from the vicinity of the joined portions or from the marginal portions of the communication port caused by breakage.

Moreover, the lap portion may include a tuck in the edge of the terminal portion of the upstream side base cloth, such that a transverse length of the terminal portion of the upstream side base cloth is reduced, and closing of the communication port by that the terminal portions of the upstream and downstream side base cloths contact each other is facilitated when the lap portion contacts with the windshield.

With this construction, the terminal portion of the upstream side base cloth has a shorter transverse length because of the tuck, in a range up to the edge. This enlarges a clearance between the edge center of the upstream side base cloth and the edge center of the downstream side base cloth when the communication port is opened, so that the airbag secures a wide opening area of the communication port. Accordingly, when engaging a target object of protection halfway of inflation, the airbag properly exhausts inflation gas from the wide open communication port and suppresses increase of internal pressure. Of course, when the airbag completes inflation without engaging the target object halfway of inflation, since the edge of the terminal portion of the downstream side base cloth is pressed by the wind shield onto the terminal portion of the upstream side base cloth, the communication port is closed. Therefore, leakage of inflation gas is prevented.

The above working effects are also obtained by forming a recess in the vicinity of transverse center of the edge of the terminal portion of the upstream side base cloth such that an edge center of the recess is located forward than left and right edges of the same. This way, too, closing of the communication port by that the terminal portions of the upstream and downstream side base cloths contact each other is facilitated when the lap portion contacts with the windshield.

More specifically, the recess reduces a front-rear lap amount of the terminal portions of the upstream and downstream side base cloths in the vicinity of transverse centers of the terminal portions of the upstream and downstream side base cloths in the lap portion. This enlarges a clearance between the edge center of the upstream side base cloth and the edge center of the downstream side base cloth when the communication port is opened, so that the airbag secures a wide opening area of the communication port. Accordingly, when engaging a target object of protection halfway of inflation, the airbag properly exhausts inflation gas from the wide open communication port and suppresses increase of internal pressure. Of course, when the airbag completes inflation without engaging the target object halfway of inflation, since the terminal portion of the downstream side base cloth is pressed by the wind shield onto the terminal portion of the upstream side base cloth, the communication port is closed. Therefore, leakage of inflation gas is prevented.

In this case, the lap portion desirably includes an outer joined portion and an inner joined portion in each of left and right sides of the terminal portions in a direction extending along the edges of the terminal portions of the upstream and downstream side base cloths. The outer joined portions are located in left and right edge vicinities of the upper wall of the cylindrical wall, respectively, and the inner joined portions extend toward transverse center from left and right edges of the upper wall of the cylindrical wall, respectively. Inner ends of the left and right inner joined portions do not contact with the recess, and are located rearward than the front end of the recess with respect to positions in front-rear direction of the airbag in a condition that the upper wall of the cylindrical wall is flatly developed.

With the inner joined portions constructed as described above, transverse width of the communication port is narrowed. Accordingly, when the airbag is completely inflated, the edge of the terminal portion of the downstream side base cloth is pressed onto the terminal portion of the upstream side base cloth by the wind shield. Therefore, a closed condition of the communication port is stably secured, while, when engaging a target object halfway of inflation, an open condition of the communication port for exhausting inflation gas is secured because of the small lap amount in the vicinity of the edge centers of the terminal portions in the lap portion.

In this case, moreover, it is desired that a distance between the inner ends of the left and right inner joined portions is in a range of 100 to 300 mm, in a condition that the upper wall of the cylindrical wall is flatly developed, and that the lap amount, in front-rear direction of vehicle, of the terminal portions of the upstream and downstream side base cloths between the front end of the recess and the edge of the terminal portion of the downstream side base cloth is in a range of 30 to 200 mm, in a condition that the upper wall of the cylindrical wall is flatly developed.

If the distance between the inner ends of the left and right inner joined portions is less than 100 mm, when the upper wall of the cylindrical wall is flatly developed, an enough opening area of the communication port for smooth exhaustion of inflation gas is hard to secure upon engaging a target object of protection halfway of inflation, especially when the lap amount is great. If the distance surpasses 300 mm, the stable closed condition of the communication port is hard to secure from airbag to airbag, especially when the lap amount is small. Meanwhile, if the lap amount of the upstream and downstream side base cloths in front-rear direction is less than 30 mm when the upper wall is flatly developed, the stable closed condition of the communication port is hard to secure from airbag to airbag, especially when the distance between the leading ends of the left and right inner joined portions is great. If the lap mount surpasses 200 mm, an enough opening area of the communication port for smooth exhaustion of inflation gas is hard to secure, especially when the distance between the inner ends of the left and right inner joined portions is small.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
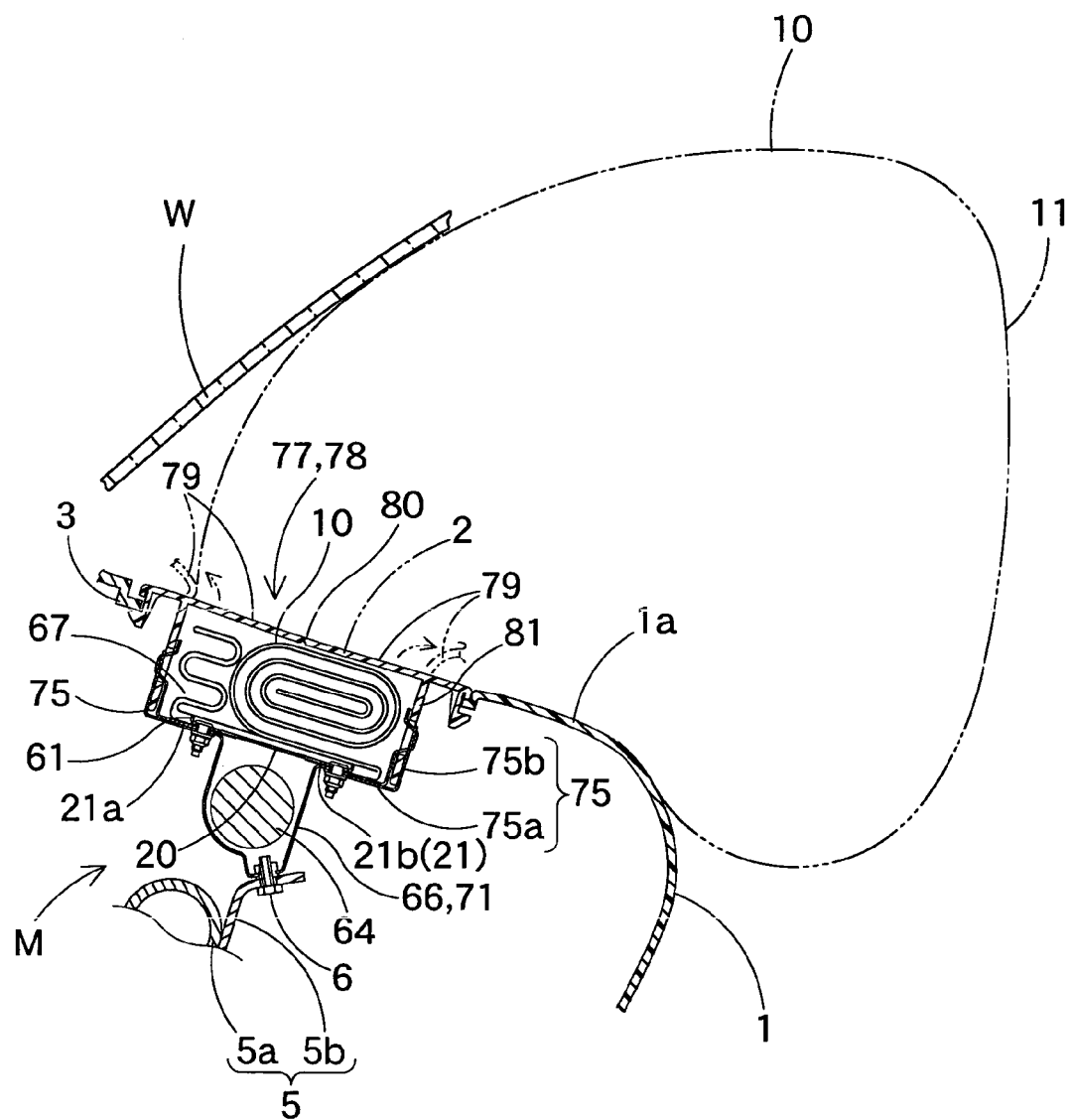
FIG. 1 is a schematic section of an airbag device for front passenger's seat in which an airbag of the present invention is employed, taken along front-rear direction of vehicle, the airbag device being mounted on vehicle.
Figure 2:
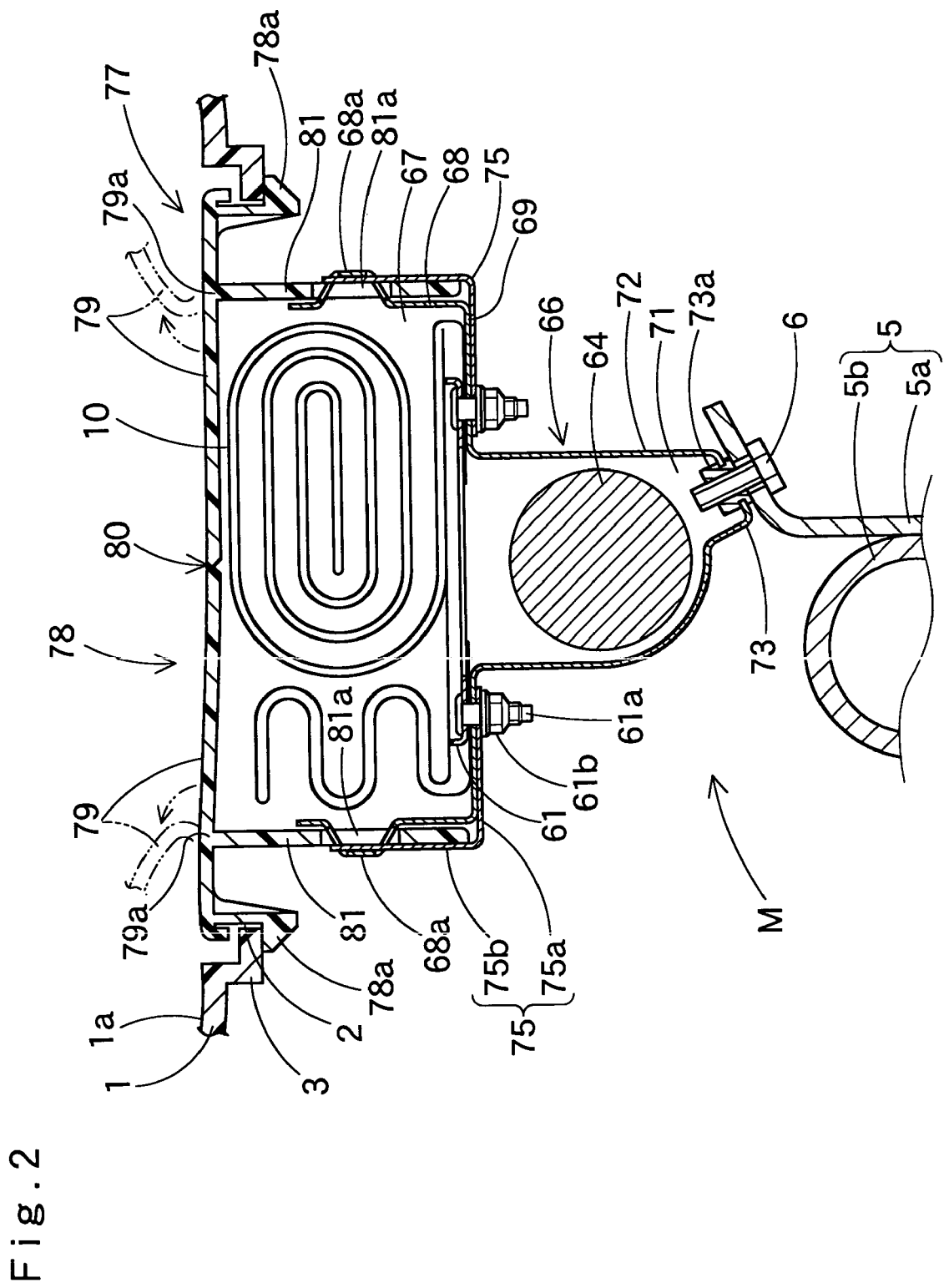
FIG. 2 is a schematic enlarged section of the airbag device of FIG. 1.

FIGS. 1 and 2 illustrate an airbag 10 according to the present invention, which is used for an airbag device M for front passenger's seat. The airbag device M for front passenger's seat is a top-mount type that is disposed in interior of a top face 1a of instrument panel (as will be called dashboard herein after) 1. The airbag device M includes a folded airbag 10, an inflator 64 for supplying the airbag 10 with inflation gas, a case 66 for housing and holding the airbag 10 and the inflator 64, a retainer 61 for attaching the airbag 10 to the case 66, an airbag cover 77 for covering the folded airbag 10, and two holder plates 75 for securing the airbag cover 77 to the case 66.

The retainer 61 is made of sheet metal into a square annular shape, and is provided at predetermined positions with bolts 61a extending downward. The bolts 61a are inserted through later-described mounting holes 22 of the airbag 10, later-described bottom wall 69 of the case 66, later-described lateral plates 75a of the holder plates 75, and then fastened into nuts 61b, thereby the retainer 61 is attached to the case 66.

The inflator 64 has a cylindrical shape, and is housed in and held by a later-described lower chamber 71 of the case 66.

Referring to FIGS. 1 and 2, the airbag cover 77 is made from thermo-plastic elastomer or the like of olefins, esters or the like, and includes a ceiling wall 78 disposed to cover a rectangular opening 2 of the dashboard 1, and a side wall 81 extending downward in a generally square cylindrical shape from back side of the ceiling wall 78. The ceiling wall 78 includes two, front and rear, doors 79 inside an area enclosed by the side wall 81. Around the doors 79 are a thinned breakable portion 80. The breakable portion 80 is arranged in a generally H-shape as viewed from upper side of the ceiling wall 78. Each of the doors 79 has a hinge line 79a in front/rear end thereof apart from the breakable portion 80. When pushed and broken by the inflating airbag 10, the doors 79 open front and rearwards of vehicle, respectively, as indicated by double-dotted lines in FIGS. 1 and 2, and as shown in FIG. 16. The ceiling wall 78 is provided, in vehicle front and rear edges, with retaining legs 78a projecting downwards, as shown in FIG. 2. Each of the retaining legs 78a is retained in lower side of a flange 3 of the dashboard 1, which is a stepped portion located in periphery of the opening 2 of the dashboard 1. The side wall 81 is provided, in vehicle's front and rear positions, with retaining holes 81a going through in vehicle's front-rear direction. The side wall 81 is joined to a later-described upper chamber 67 of the case 66 utilizing these retaining holes 81a and the holder plates 75.

The holder plates 75 are located in vehicle's front and rear positions of the case 66, respectively. Each of the holder plates 75 is made of sheet metal, and includes a lateral plate 75a and a vertical plate 75b extending upward from an end of the lateral plate 75a, thereby having a L-shaped section. Each of the lateral plates 75a includes through holes (reference numeral omitted) for inserting the bolts 61a of the retainer 61 therethrough. Upper end of each of the vertical plates 75b is configured to be inserted through a later-described retaining projection 68a of the case 66.

The case 66 is made of sheet metal, and includes a rectangular parallelepiped upper chamber 67 opened upward, and a lower chamber 71 located in lower side to be communicated with the upper chamber 67.

The upper chamber 67 includes a generally square cylindrical circumferential wall 68, and a bottom wall 69 located below the circumferential wall 68. The circumferential wall 68 is provided with retaining projections 68a each of which projects outward. Each of the retaining projections 68a is inserted into the retaining hole 81a of the airbag cover side wall 81. The bottom wall 69 has through holes (reference numeral omitted) for inserting the bolts 61a of the retainer 61 therethrough. The lateral plates 75a of the holder plates 75 butt against lower sides of vehicle's front and rear positions of the bottom wall 69.

The lower chamber 71 includes a circumferential wall 72 extending downward from interior end of the upper chamber bottom wall 69 in a generally square cylindrical shape, and a bottom wall 73 closing the circumferential wall 72 at the lower end. The bottom wall 73 is provided with nuts 73a for attaching the case 66 to vehicle body 5. The bottom wall 73 is attached to brackets 5b extending from reinforcement 5a of vehicle body 5, by fastening bolts 6 into the nuts 73a via joint holes (reference numeral omitted) formed in the brackets 5b.

Figure 3:
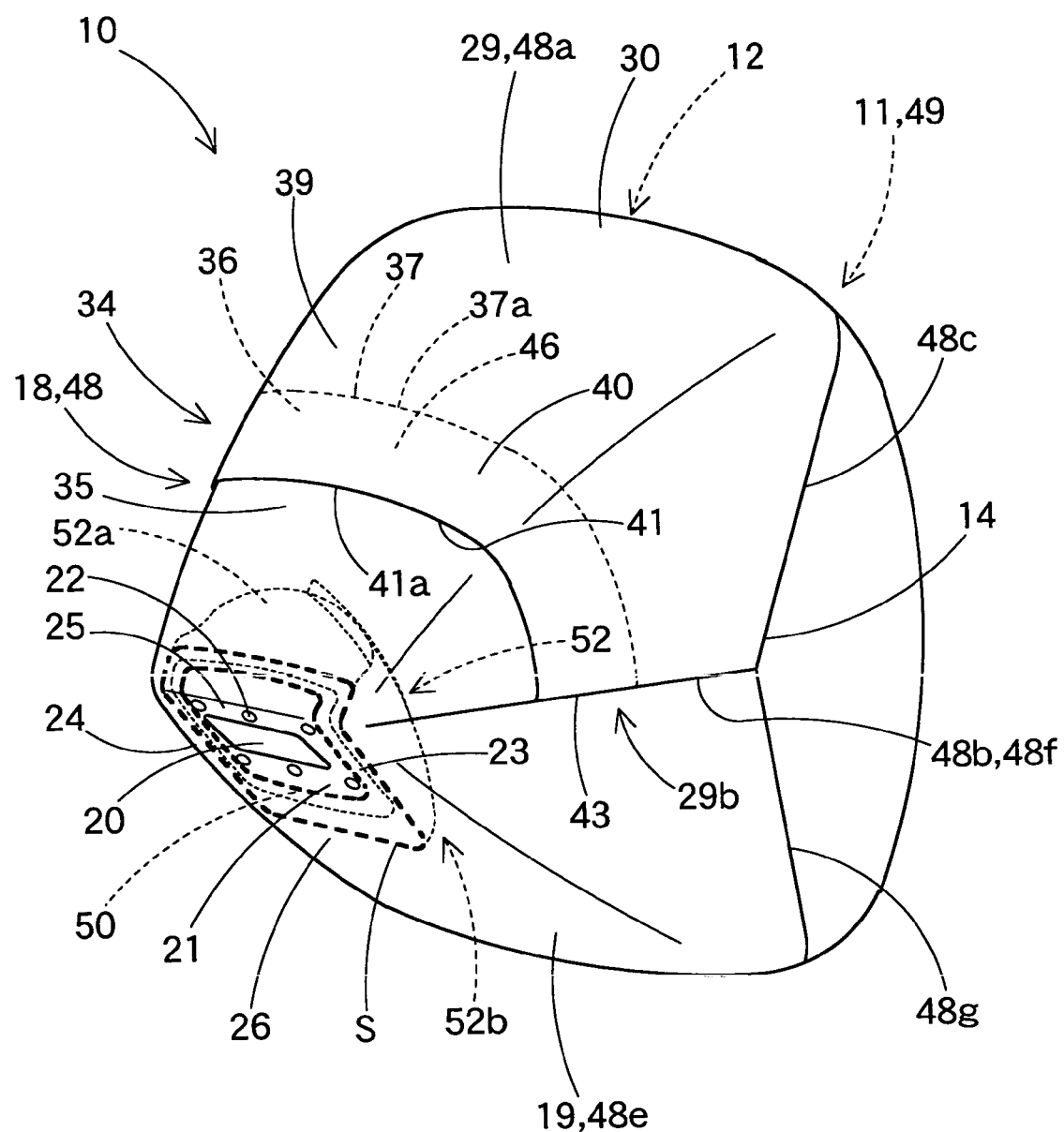
FIG. 3 is a perspective view of an embodiment of the airbag of the present invention inflating by itself.
Figure 4:
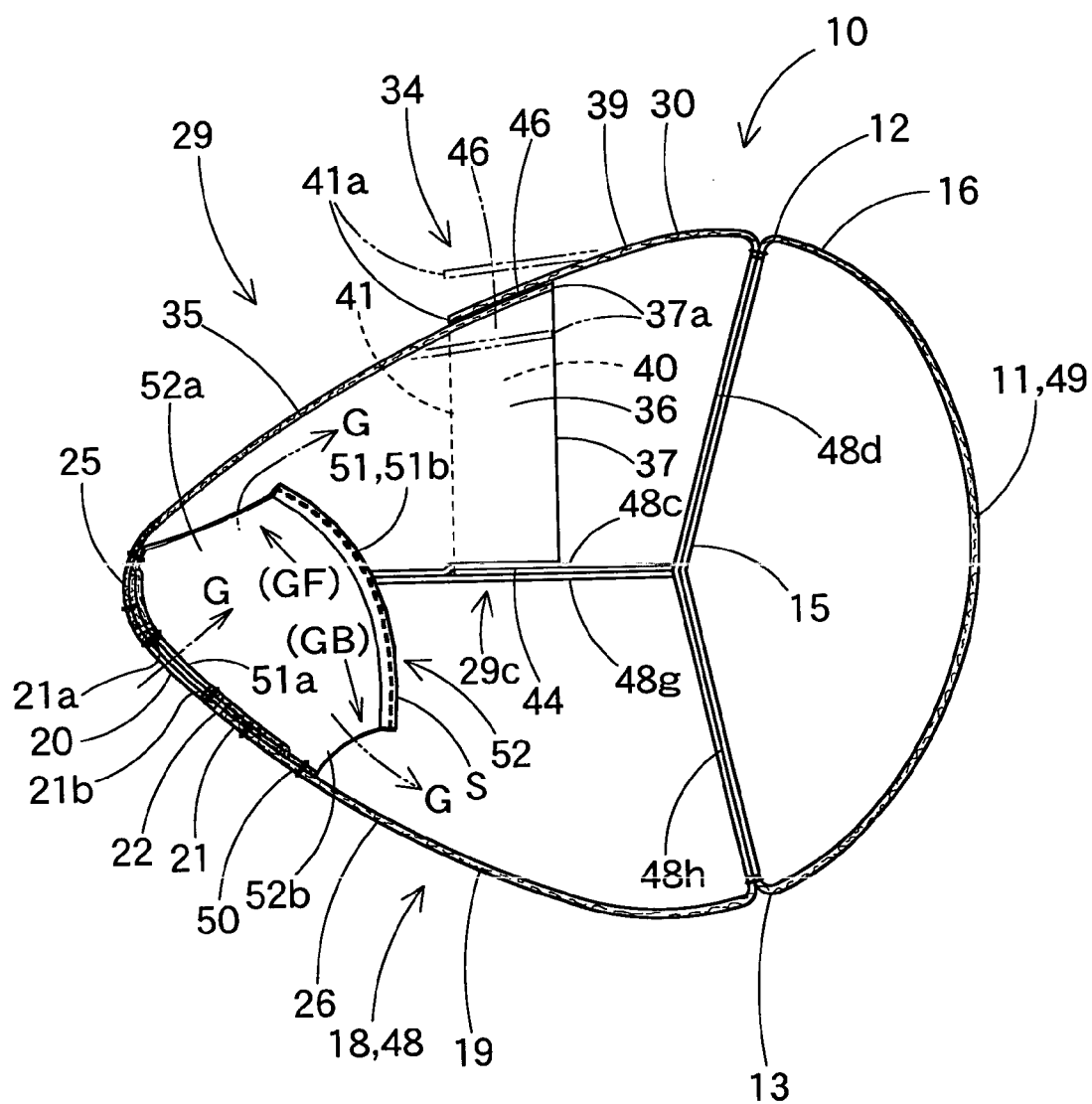
FIG. 4 is a sectional view of the airbag of FIG. 3, taken along front-rear direction.

Referring to FIGS. 3 and 4, the airbag 10 has a generally conical shape when completely inflated. The airbag 10 includes a passenger side wall 11 as recipient wall that is deployed generally vertically at passenger side, and a cylindrical wall 18 converging forward of vehicle from outer circumference of the passenger side wall 11 in a generally conical shape. In the airbag 10 being an airbag for front passenger' seat, its rear side is thrown against a passenger as target object of protection, for protecting the same. Therefore, the rear side, namely the passenger side wall 11 is the recipient wall.

A lower side of the cylindrical wall 18 as deployed serves as a lower wall 19. The lower wall 19 is provided at front part thereof with a rectangular inlet port 20 for admitting inflation gas G (refer to FIG. 4) into the airbag 10. In a periphery 21 of the inlet port 20 are mounting holes 22. The bolts 61a of the retainer 61 are inserted through the mounting holes 22. The airbag 10 is held by the bottom wall 69 of the case 66 by these bolts 61a. The-airbag 10 is further provided in the vicinity of the mounting holes 22 in the inlet port periphery 21 in inner surface thereof with a reinforcing cloth 50. The reinforcing cloth 50 has a generally square annular shape, and is woven by polyester, polyamide yarns or the like.

The airbag 10 is provided in left and right sides of the cylindrical wall 18 with unillustrated vent holes for exhausting extra inflation gas.

When the airbag device M is mounted on vehicle with the airbag 10 held by the case bottom wall 69 with the retainer 10, and with the case 66 attached to the vehicle body 5, an opening plane of the inlet port 20 is arranged generally horizontally. At this time, more precisely, a front edge 21a of the inlet port periphery 21 is located in a slightly higher level than a rear edge 21b, as shown in FIG. 1.

Moreover, the airbag 10 is internally provided with a flow regulating cloth 52. The flow regulating cloth 52 is disposed to cover the inlet port 20, and is adapted to redirect inflation gas G flown in the airbag 10 forward and rearward. The cloth 52 includes two outlet ports 52a and 52b for emitting inflation gas G forward and rearward, respectively. The front outlet port 52a emits inflation gas G forward of the inlet port periphery 21, and then delivers the gas rearward along inner surface of a later-described upper wall 29 of the cylindrical wall 18.

An upper part of the cylindrical wall 18 apart from the passenger side wall 11 serves as an upper wall 29. The upper wall 29 includes a lap portion 34 formed by having a base cloth 48 forming a circumferential wall of the airbag 10 partially overlapped. The lap portion 34 is formed by a terminal portion 36 of an upstream side base cloth 35 and a terminal portion 40 of a downstream side base cloth 39. The upstream side base cloth 35 is located in upstream side of inflation gas G. The downstream side base cloth 39 is located in downstream side of inflation gas G. The lap portion 34 is constructed such that the terminal portion 36 of the upstream side base cloth 35 is masked from surface of the airbag 10. That is, the lap portion 34 is formed by superposing the terminal portion 40 of the downstream side base cloth 39 on the terminal portion 36 of the upstream side base cloth 35. The lap portion 34 includes joined portions 43 and 44. The joined portions 43 and 44 (refer to FIGS. 5 and 6) are formed by joining, e.g., stitching or the like, the terminal portions 36 and 40 of the upstream and downstream side base cloths 35 and 39 only in both ends of the terminal portions 36 and 40 in a direction extending along edges 37 and 41.

In the airbag 10 for front passenger's seat, the passenger side wall 11 is located in an end plane (rear plane) of airbag circumferential wall, or in stream terminal of inflation gas G. The lap portion 34 is located in the cylindrical wall 18 which is in upperstream of inflation gas G than an outer edge of the passenger side wall 11. In the foregoing embodiment, moreover, the lap portion 34 is constructed such that the edges 37 and 41 of the terminal portions 36 and 40 of the upstream and downstream side base cloths 35 and 39 are generally parallel to the passenger side wall 11 as deployed generally vertically when the airbag is completely inflated, in other words, such that the edges 37 and 41 of the terminal portions 36 and 40 are disposed along left-right direction.

In the lap portion 34, furthermore, the edge 41 of the terminal portion 40 of the downstream side base cloth 39 is located forward of the edge 37 of the terminal portion 36 of the upstream side base cloth 35. The lap portion 34 is constructed such that centers 37a and 41a in left-right direction of the edges 37 and 41 may be located in a center of a portion of the upper wall 29 of the cylindrical wall 18 contacting a wind shield W when the airbag is completely inflated.

Still moreover, the lap portion 34 is constructed such that the edges 37 and 41 of the terminal portions 36 and 40 of the upstream and downstream side base cloths 35 and 39 extend along left-right direction of the airbag 10 as completely inflated, up to the vicinity of left and right edges 29b and 29c of the upper wall 29 hung downward. In the foregoing embodiment, the edges 37 and 41 extend up to the vicinity of the left and right edges 29b and 29c of the upper wall 29 hung downward, in a condition that the joined portions 43 and 44 are located in left and right sides of the cylindrical wall 18, or in later-described edges 48b and 48c. In the foregoing embodiment, the left and right edges 29b and 29c are portions most projecting in left-right direction in a vertical section taken along left-right direction of the airbag 10 as completely inflated, i.e., in a vertical section generally parallel to the passenger side wall 11.

The lap portion 34 includes a communication port 46 communicating inside and outside of the airbag 10. The communication port 46 is formed between the terminal portions 36 and 40 of the upstream and downstream side base cloths 35 and 39 between the joined portions 43 and 44. Lap amount LR (refer to FIG. 5) of the terminal portions 36 and 40 of the upstream and downstream side base cloths 35 and 39 in front-rear direction, and length or distance LC (refer to FIG. 5) between the joined portions 43 and 44 in left-right direction are predetermined as follows: the lap amount LR and distance LC are predetermined such that, in the course of unfolding and inflation, the airbag 10 admits air A from the atmosphere outside the airbag 10 via the communication port 46 by ejector action of inflation gas G flowing toward the downstream side base cloth 39 from the upstream side base cloth 35, as shown in FIG. 16. The lap amount LR and distance LC are also predetermined such that, when the airbag 10 engages the passenger PC having approached the airbag 10 halfway of inflation, inflation gas G is exhausted out of the airbag 10 from the communication port 46, as shown in FIG. 18. Moreover, the lap amount LR and distance LC are predetermined such that, when the airbag 10 is completely inflated, the terminal portions 36 and 40 of the upstream and downstream side base cloths 35 and 39 contact each other to close the communication port 46, as shown in FIG. 17. In the foregoing embodiment, the lap amount LR is 80 mm, while the distance LC, between longitudinal intermediate positions of the joined portions 43 and 44, is 200 mm.

Figure 5:
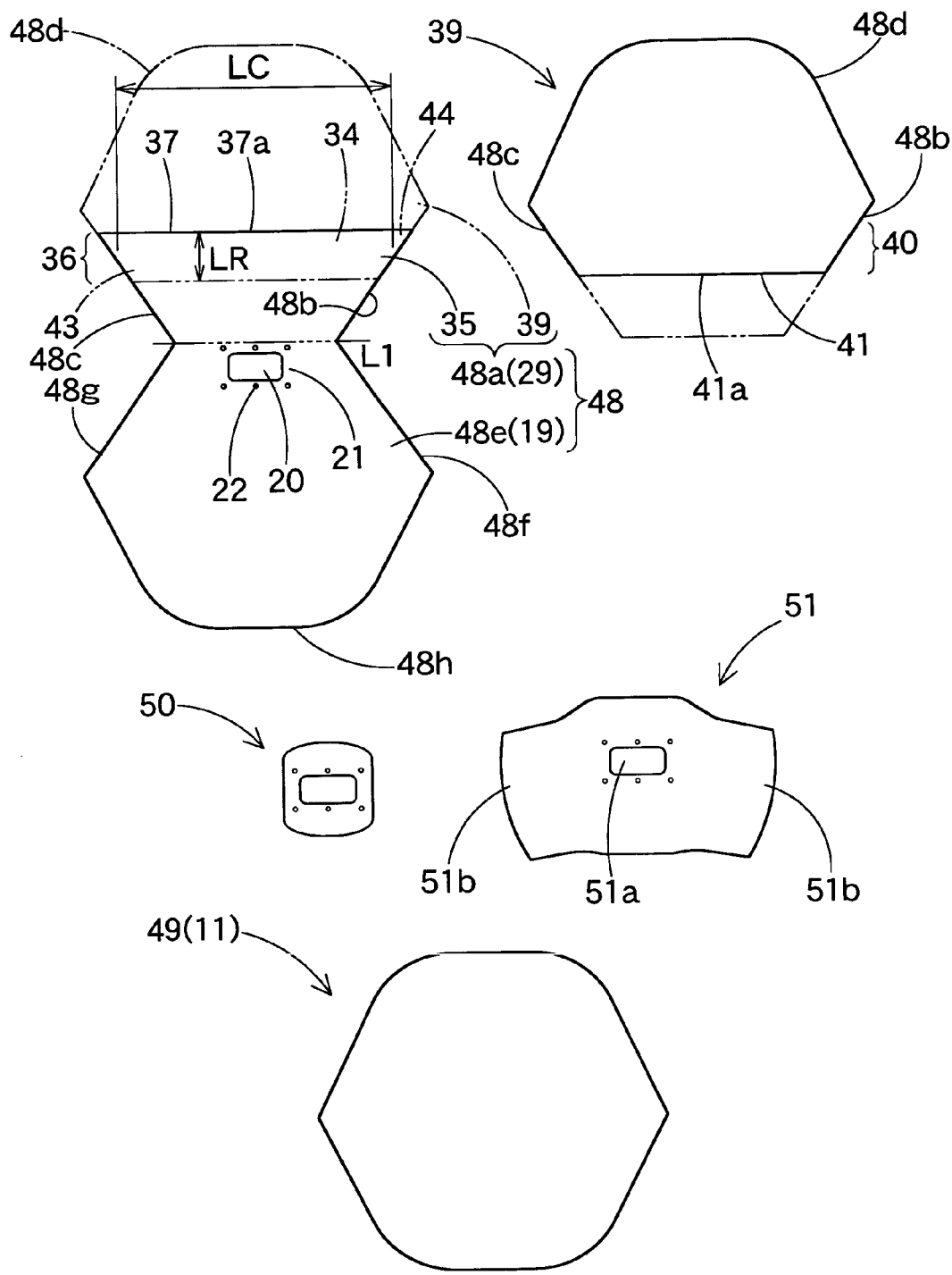
FIG. 5 illustrates constituent parts of the airbag of FIG. 3 by plan views.

As shown in FIGS. 5 and 6, the airbag 10 is manufactured by sewing up two base cloths, i.e., a first base cloth 48 in which the upstream side and downstream side base cloths 35 and 39 are joined to each other, and a second base cloth 49. The first and second base cloths 48 and 49 are woven with polyester yarn, polyamide yarn or the like. The first base cloth 48 has a configuration in which two generally hexagonal cloth pieces in upper portion 48a and a lower portion 48e are combined, and resultingly has a gourd-shape with its longitudinal center portions in left and right edges recessed.

The upper portion 48a of the first base cloth 48 apart from the inlet port 20 consists of the upstream side base cloth 35 and downstream side base cloths 39 for providing the lap portion 34. In the illustrated embodiment, the upstream side base cloth 35 is integral with the lower portion 48e. If the joined portions 43 and 44 are provided by sewing up left and right edges of the base cloths 35 and 39 with sewing yarn S in the edges 48b and 48c of the upper portion 48a in a condition that the downstream side base cloth 39 is overlaid on the upstream side base cloth 35, the lap portion 34 is formed, and the first base cloth 48 is complete.

The second base cloth 49 has a generally round shape approximate to a generally hexagonal shape.

These planar base cloths 48 and 49 provide the solid airbag 10 by sewing work.

The second base cloth 49 defines a generally entire area of the passenger side wall 11 of the airbag 10, whereas the first base cloth 48 defines a generally entire area of the cylindrical wall 18 of the airbag 10. Moreover, the upper portion 48a of the first base cloth 48 defines a generally entire area of the upper wall 29, or an upper part of the cylindrical wall 18, whereas the lower portion 48e of the first base cloth 48 defines a generally entire area of the lower wall 19 or a lower part of the cylindrical wall 18.

As shown in FIGS. 3 and 4, the flow regulating cloth 52 has a larger contour than longitudinal and transverse dimensions of the gas inlet port 20 so as to cover the gas inlet port 20 within the airbag 10. Its section taken along front-rear direction in the vicinity of the inlet port 20 upon deployment of the airbag 10 is arcuate bulging upward away from the gas inlet port 20.

In the illustrated embodiment, the flow regulating cloth 52 is prepared as a cloth member 51 before being attached to the airbag 10, as shown in FIG. 5. The cloth member 51 is made of woven fabric of polyester, polyamide or the like. The cloth member 51 has an opening 51a corresponding to the gas inlet port 20, and band portions 51b extending from left and right sides of the opening 51a. If leading ends of the band portions 51b are sewn up to provide outlet ports 52a and 52b for emitting inflation gas G forward and rearward, the flow regulating cloth 52 is complete. The cloth member 51 further includes holes (reference numeral omitted) corresponding to the mounting holes 22.

Figure 6A:
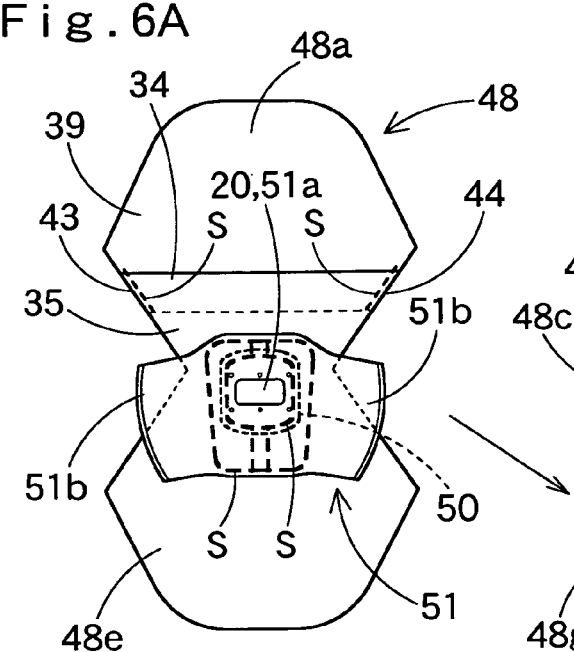
FIGS. 6A to 6E illustrate manufacturing process of the airbag of FIG. 3 in order.
Figure 6B:
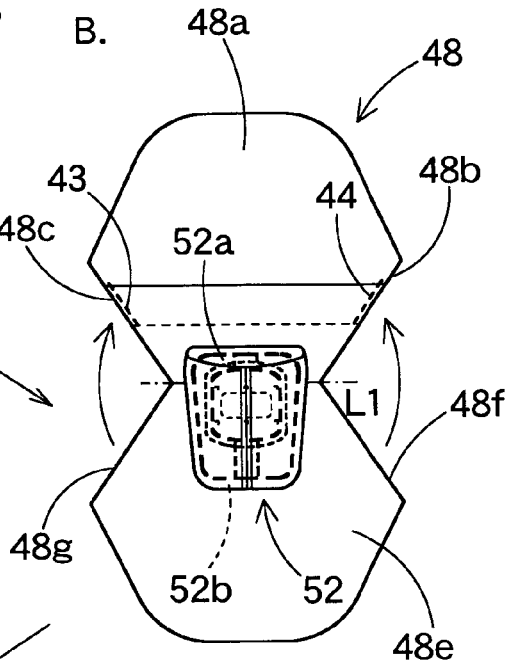

As shown in FIGS. 5 and 6A, manufacturing of the airbag 10 begins with sewing up the upstream side base cloth 35 and the downstream side base cloth 39 to form the upper portion 48a. Meanwhile, the reinforcing cloth 50 and the cloth member 51 are stitched to an inner side of the first base cloth 48 in the periphery 21 of the gas inlet port 20 by stitching yarn S. As shown in FIG. 6B, subsequently, leading ends of the band portions 51b of the cloth member 51 are stitched up in an arcuate shape by stitching yarn S, thereby the flow regulating cloth 52 is formed into a predetermined shape.

Figure 6C:
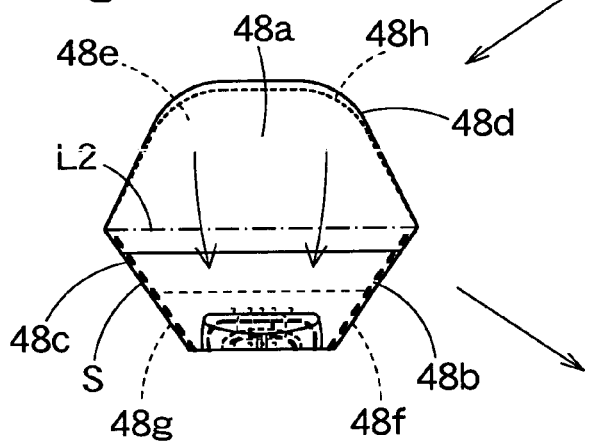

As shown in FIGS. 6B and 6C, thereafter, the first base cloth 48 is folded back on a first base line L1 extending in left-right direction between the upper portion 48a and the lower portion 48e. Then, in left and right edges around the inlet port 20 of the first base cloth 48, straight edges 48b and 48f of the upper and lower portions 48a and 48b near the first base line L1 are stitched up with stitching yarn S, and the other straight edges 48c and 48g are stitched up likewise. This folding on the first base line L1 shown in FIGS. 6B and 6C is performed such that outer surfaces of the airbag 10 contact each other in the upper portion 48a and lower portion 48e.

Figure 6D:
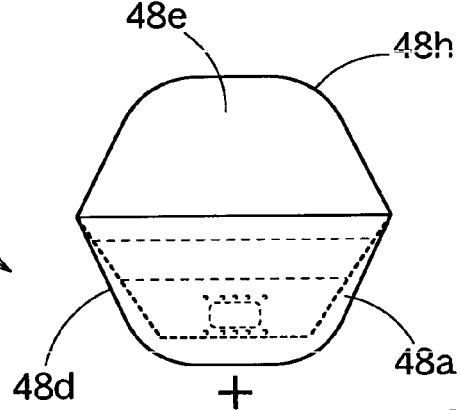

Subsequently as shown in FIGS. 6C and 6D, the upper portion 48a is folded back on a second base line L2 extending in left-right direction between portions projected in left and right directions, so that unstitched edges 48d and 48h of the upper and lower portions 48a and 48e are separated and developed flatly. An outer contour of this developed state is the same as an outer contour of the second base cloth 49.

Figure 6E:
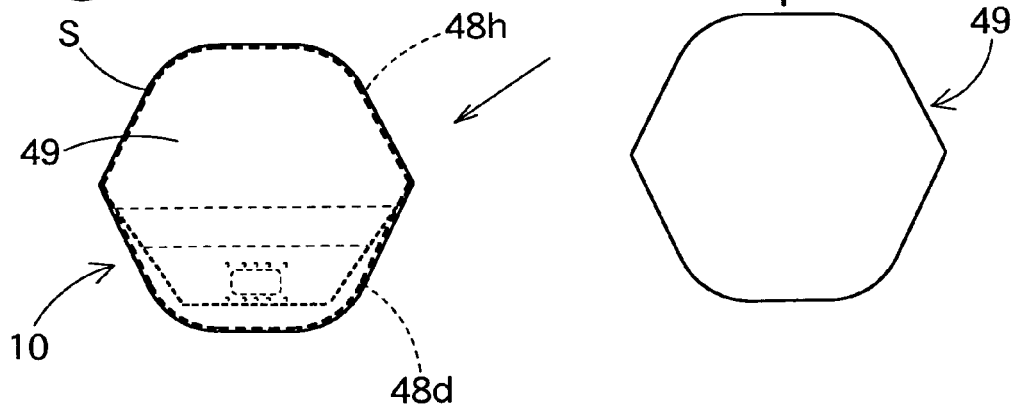

Then as shown in FIGS. 6D and 6E, the second base cloth 49 is applied thereon, and overlapped outer edge is sewn up 20 by stitching yarn S. Thus the airbag 10 is formed into a bag shape.

After the bag shape is formed, the airbag 10 is reversed inside out from the gas inlet port 20 so that stitch allowances may not appear on outer surface.

If it is difficult to reverse the airbag 10 from the gas inlet port 20 because of presence of the flow regulating cloth 52, sewing work of ends of the band portions 51b of the cloth member 51 may be performed after reversing the airbag 10. That is, after reversing the airbag 10, the band portions 51b are pulled out of the gas inlet port 20, sewn up and then put back inside the airbag 10.

Mounting of the airbag 10 thus manufactured on the vehicle is started by placing the retainer 61 inside the airbag 10 so that the bolts 61a may be protruded from the mounting holes 22, and then the airbag 10 is folded up. Thereafter, the folded airbag 10 is wrapped by an unillustrated breakable wrapping sheet to keep the folded-up configuration.

Folding process of the airbag 10 includes preparatory folding step, transverse folding step, and vertical folding step.

Figure 7:
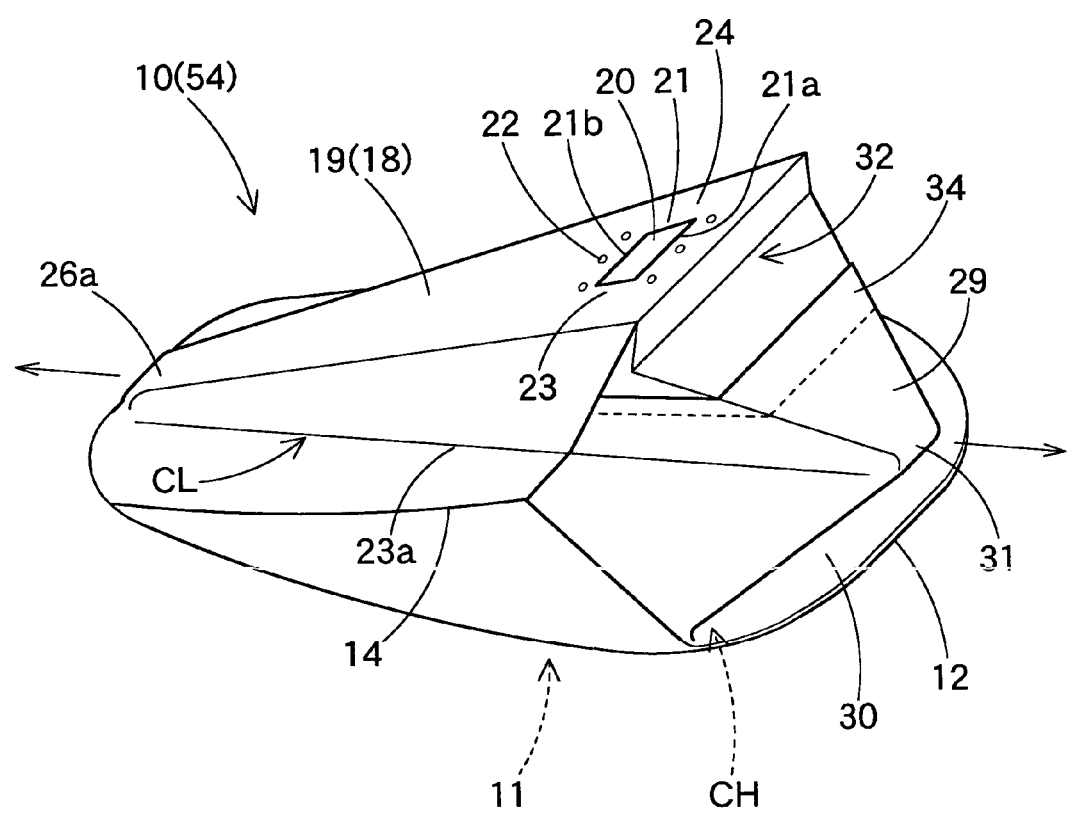
FIG. 7 is a perspective view illustrating folds in a preparatory folding of the airbag of FIG. 3.
Figure 8:
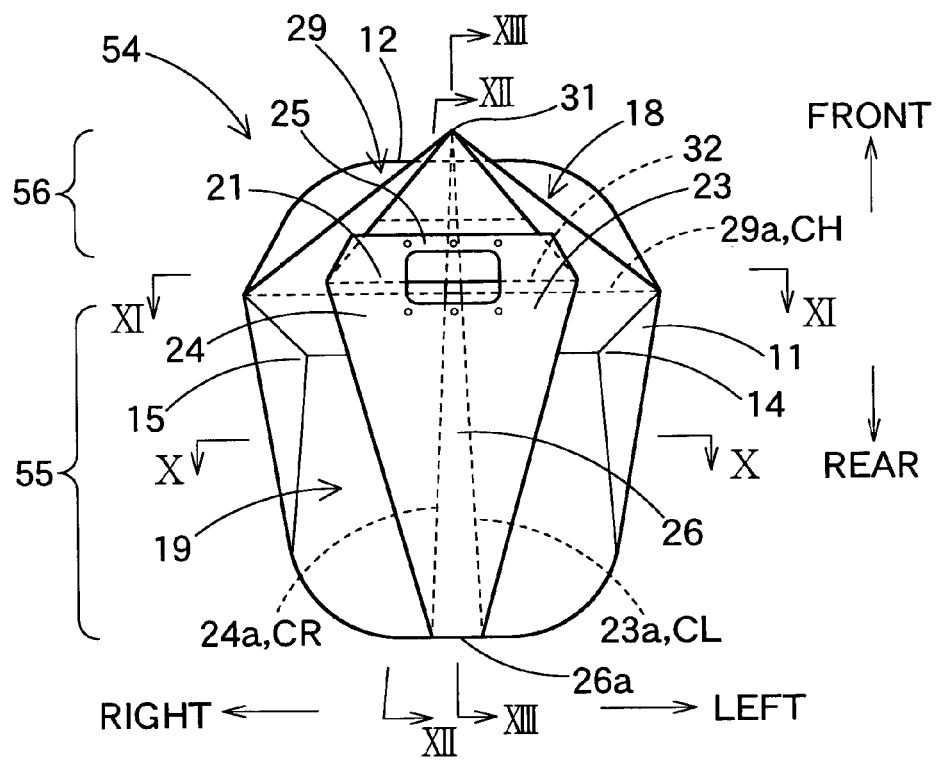
FIG. 8 illustrates the airbag of FIG. 7 having gone through the preparatory folding step, as viewed from a gas inlet port.
Figure 9:
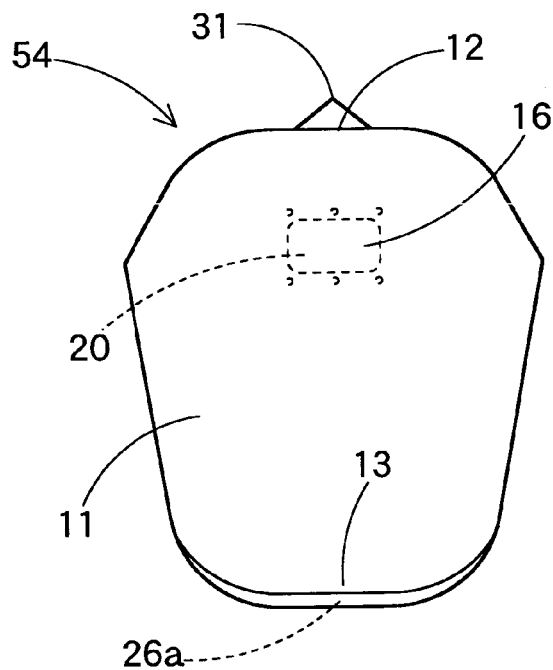
FIG. 9 illustrates the airbag of FIG. 7 as viewed from a passenger side wall.
Figure 10:
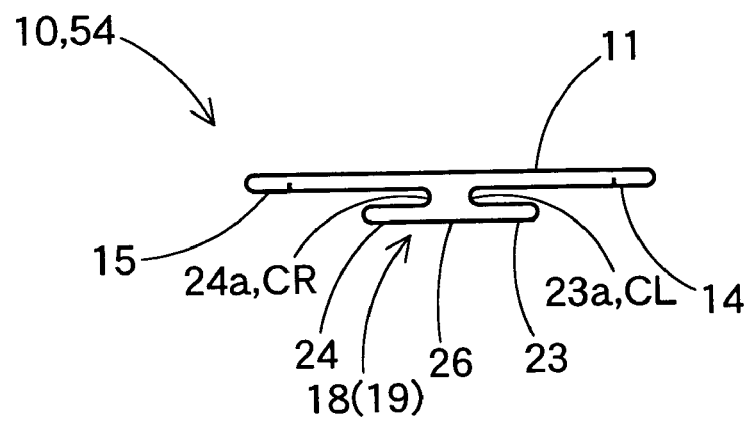
FIG. 10 is an end view taken along line X-X of FIG. 8.
Figure 11:
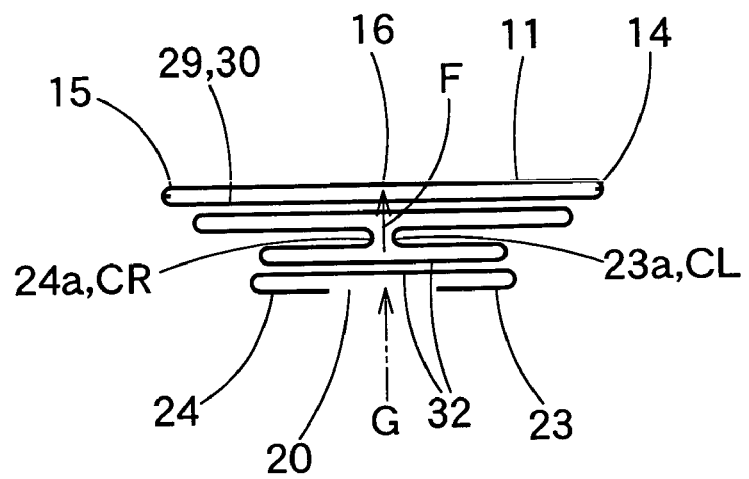
FIG. 11 is an end view taken along line XI-XI of FIG. 8.
Figure 12:
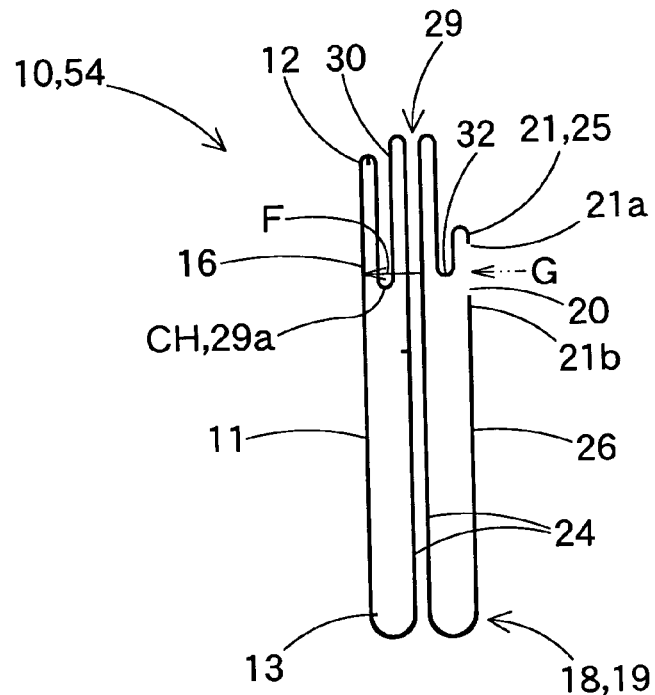
FIG. 12 is an end view taken along line XII-XII of FIG. 8.
Figure 13:
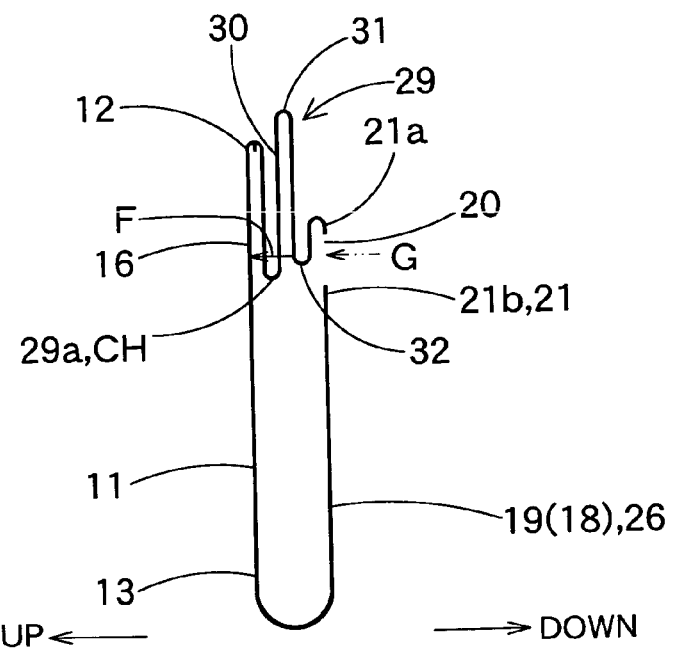
FIG. 13 is an end view taken along line XIII-XIII of FIG. 8.

The preparatory folding step provides a preparatorily folded airbag 54 shown in FIGS. 7 to 9. In the preparatory folding step, a portion 16 of the passenger side wall 11 near an upper edge 12 is placed over the as inlet port 20 to confront the gas inlet port 20 in vertical direction as shown in FIG. 13, and the passenger side wall 11 is flatly developed so as to overlap with the lower wall 19 of the cylindrical wall 18. Further in the illustrated embodiment, a generally entire area of the passenger side wall 11 is flatly developed except the vicinities of left edge 14 and right edge 15 while the cylindrical wall 18 is folded up.

In the preparatory folding step, in the cylindrical wall 18, left and right portions 23 and 24 of the gas inlet port 20 and a portion 30 near the upper edge 12 of the passenger sidewall 11 are folded on valley folds CL, CR and CH, respectively, as shown in FIGS. 7 to 13. More specifically, the left portion 23 and right portion 24 of the gas inlet port 20 are folded in on the folds CL and CR extending in front-rear direction, so that generally intermediate portions 23a and 24a of the left and right portions 23 and 24 between the inlet port 20 and left and right edges 14 and 15 of the flatly developed passenger side wall 11 are brought closer to the gas inlet port 20, i.e., the folds CL and CR are brought closer to each other, and are arranged at side of the passenger side wall 11 in the gas inlet port periphery 21. As to the portion 30 of the cylindrical wall 18 near the upper edge 12, the portion 30 is folded in on a valley fold CH extending along left-right direction, so that a generally intermediate portion 29a between a later-described protected top 31 in the upper wall 29 or front end of the folds CL and CR and the passenger side wall upper edge 12 is brought closer to the gas inlet port 20 and placed at side of the passenger side wall 11 in the gas inlet port periphery 21.

Referring to FIGS. 7 to 9, the preparatory folding is done by pulling grip portions 31 and 26a in front and rear directions to separate them. The grip portion 31 is located in a generally intermediate position between transverse center of a front edge 21a of the gas inlet port 20 and transverse center of the passenger side wall upper edge 12 in the cylindrical wall 18, which will be a projected top 31. The grip portion 26a is located in the vicinity of a transverse center of a rear portion 26 of the gas inlet port 20 in the cylindrical wall 18. The grip portion 26a in the rear portion 26 is desirably as close to a lower edge 13 of the passenger side wall 11 as possible so that a generally entire area of the passenger side wall 11 may be developed flatly in the preparatory folding step.

A portion 32 ranging from-a front portion 25 of the gas inlet port 20 to the projected top 31 in the cylindrical wall 18 is valley-folded toward the gas inlet port 20 so that the periphery 21 of the gas inlet port 20 may be flat and parallel to the passenger side wall 11.

As shown in FIGS. 8, 14A, 14B, 15A and 15B, subsequently, the transverse folding is applied to the preparatorily folded airbag 54. More specifically, front and rear portions 55 and 56 of the inlet port 20 in the preparatorily folded airbag 54 are folded on folds extending along left-right direction such that ends 55a and 56a are brought closer to the inlet port 20. In the illustrated embodiment, the rear portion 55 is rolled in a lower side of the lower wall 19 to bring the rear end 55a close to the inlet port 20, and is placed on the passenger side wall 11. The front portion 56 is folded in a bellows fashion.

Figure 15A:
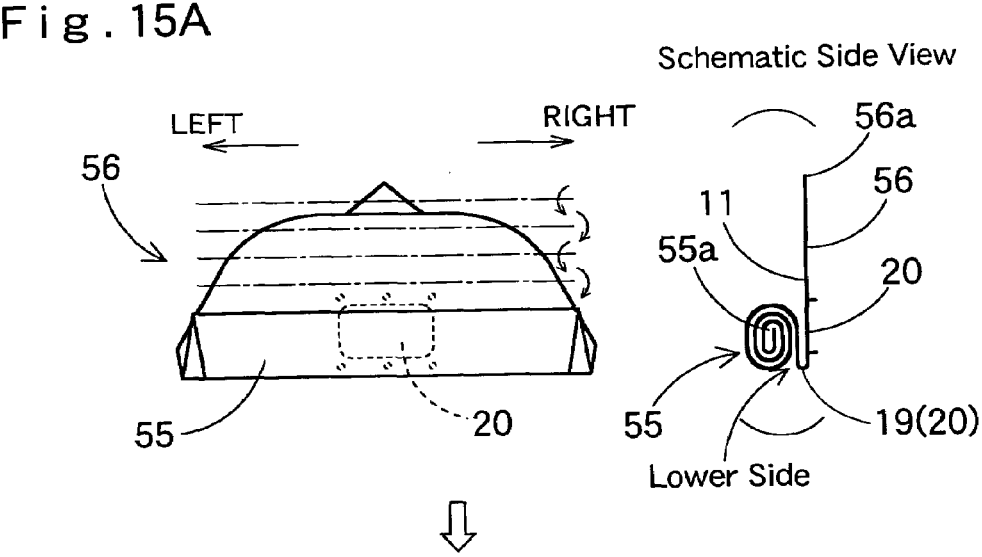
FIGS. 15A, 15B and 15C illustrate the folding process of the airbag of FIG. 3 in order, continued from FIG. 14B.
Figure 15B:
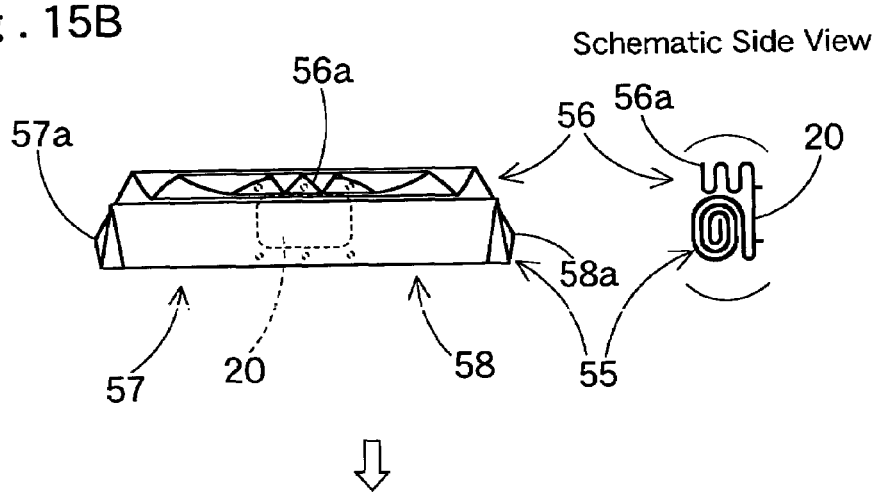
Figure 15C:
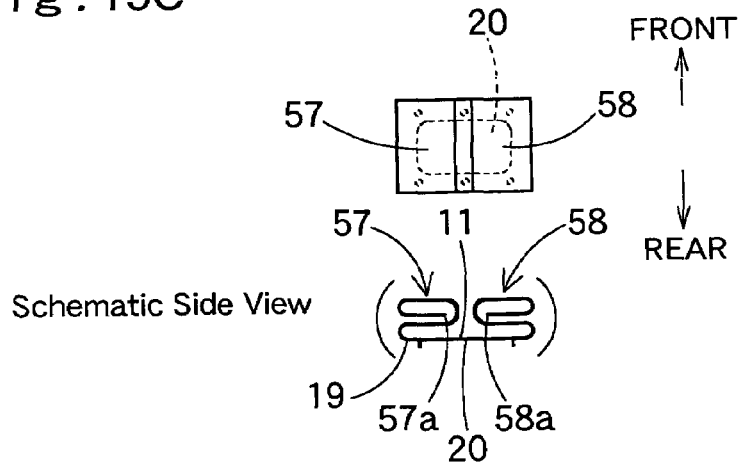

Then the vertical folding is applied, as shown in FIGS. 15B and 15C. Left and right portions 57 and 58 of the inlet port 20 in the transversely-folded airbag 10 are folded on folds extending along front-rear direction such that ends 57a and 58a are brought close to the inlet port 20. In the illustrated embodiment, the left and right portions 57 and 58 are folded back on the lower wall 19 from the ends 57a and 58a, and then bellows-folded and placed on the passenger side wall 11.

When the folding of the airbag 10 is completed by the vertical folding, the folded-up airbag 10 is wrapped by the breakable wrapping member to keep the folded-up configuration.

Thereafter, the inflator 64 is housed in the lower chamber 71 of the case 66, while the folded airbag 10 is housed in the upper chamber 67 such that bolts 61a of the retainer 61 protrude from the bottom wall 69 of the case 66. Then the side wall 81 of the airbag cover 77 is mounted around the upper chamber 67 from above such that the retaining projections 68a of the circumferential wall 68 fit in the retaining holes 81a of the side wall 81.

Subsequently, the holder plates 75 are attached to front and rear positions of the case 66 by inserting an upper end of each of the vertical plates 75b through the retaining projections 68a projecting from the side wall 81, and by inserting the bolts 61a through each of the lateral plates 75a. By then fastening the bolts 61a into the nuts 61b, the airbag device M is complete.

The airbag device M for front passenger's seat thus assembled is put in the opening 2 of the dashboard 1 having been attached to vehicle so that the retaining legs 78a are retained by the flange 3. If the case 66 is connected to vehicle body 5 by bolts 6 fixing into the nuts 73a via the brackets 5b, the airbag device M is mounted on vehicle.

After mounting the airbag device M on vehicle, when inflation gas G is discharged from the inflator 64, the airbag 10 inflates. The airbag 10 breaks the wrapping member mounted therearound, and further breaks the breakable portion 80 of the airbag cover 77. When the doors 79 open as indicated by double-dotted lines in FIG. 1 and as shown in FIG. 16, the airbag 10 protrudes from the case upper chamber 67.

Figure 16A:
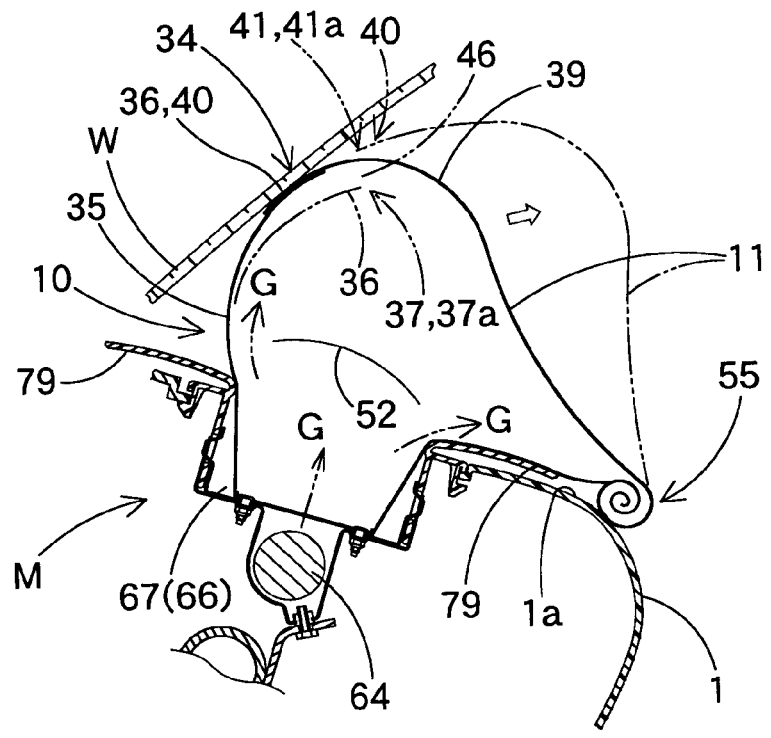
FIGS. 16A, 16B, 17A and 17B illustrate behaviors of the activated airbag of FIG. 3 in order, as viewed from side of vehicle.
Figure 16B:
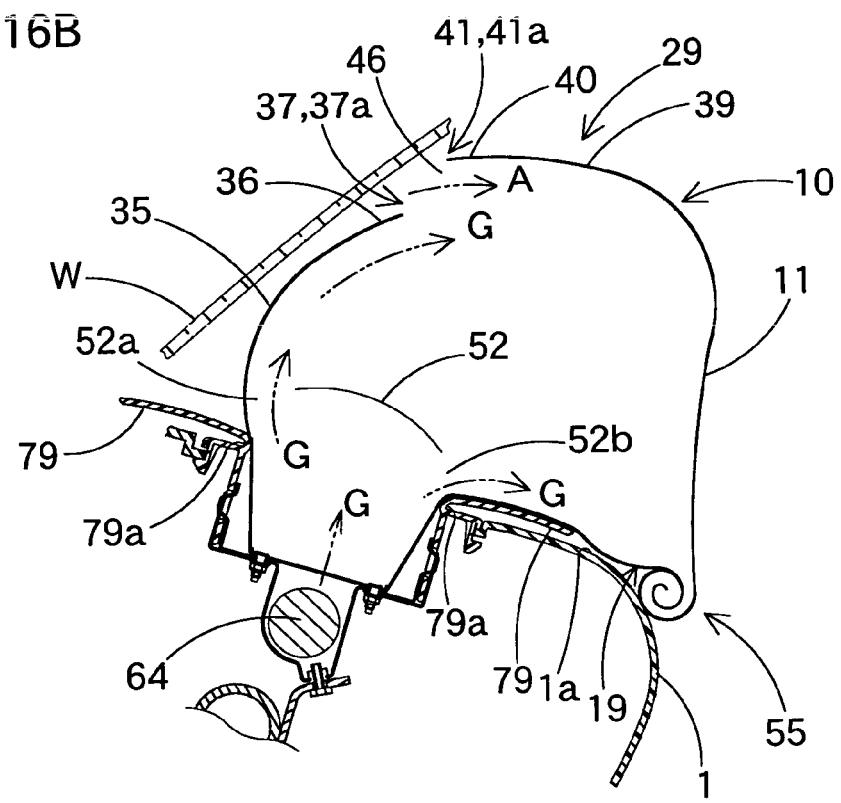

In the course of unfolding and inflation of the airbag 10, inflation gas G flows quickly from the upstream side base cloth 35 to the downstream side base cloth 39 of the lap portion 34 shown in FIGS. 16A and 16B. This causes so-called ejector action that sucks in air A from the surrounding atmosphere, the air A outside of the airbag 10 is sucked into the airbag 10 via the communication port 46. Accordingly, inflation gas G and air A cooperatively inflate the airbag 10 quickly. The communication port 46 is provided between the terminal portions 36 and 40 of the upstream and downstream side base cloths 35 and 39 and between the joined portions 43 and 44 in the lap portion 34 to establish communication between the inside and outside of the airbag 10.

Figure 17A:
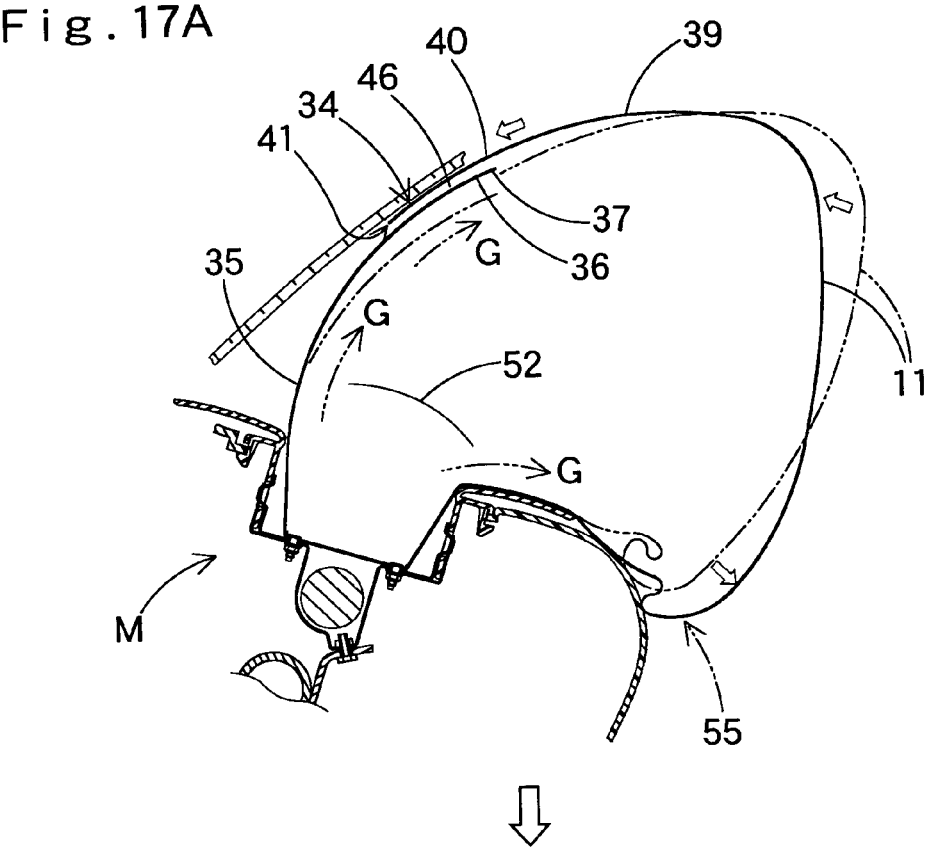
Figure 17B:
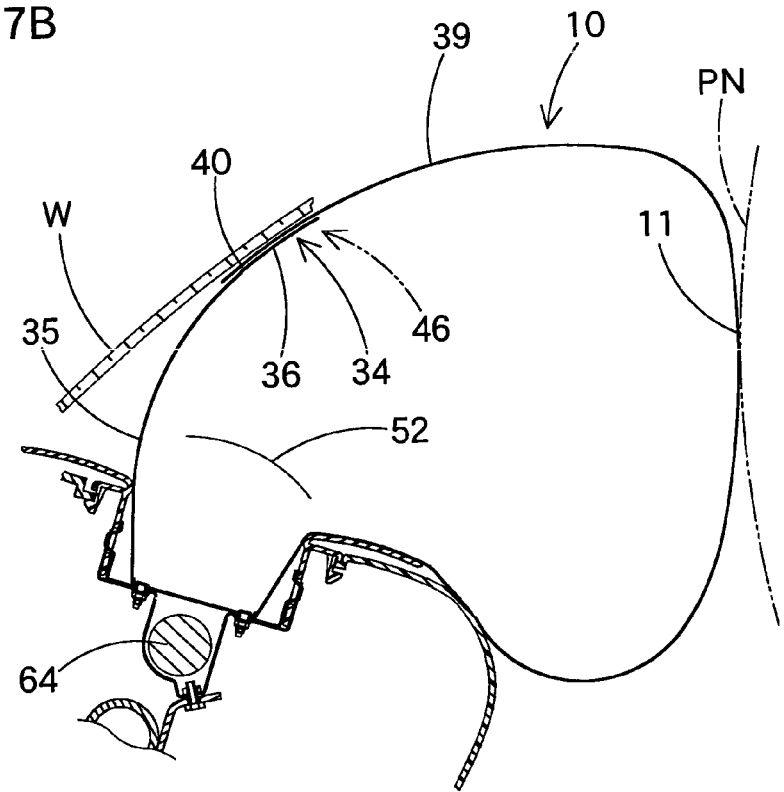

When the airbag 10 completes inflation, internal pressure of the airbag 10 brings about uniform tension in the entire circumferential wall of the airbag 10. Because of this tension, in the lap portion 34, the terminal portion 40 of the downstream side base cloth 39 comes into contact with surface of the terminal portion 36 of the upstream side base cloth 35 with no gaps. Affected by internal pressure of the airbag 10 as well, the communication port 46 is closed to suppress exhaustion of inflation gas G therefrom. As a result, the completely inflated airbag 10 protects an approaching passenger PN by the passenger side wall 11 having cushioning property, as shown in FIGS. 17A and 17B.

Figure 18A:
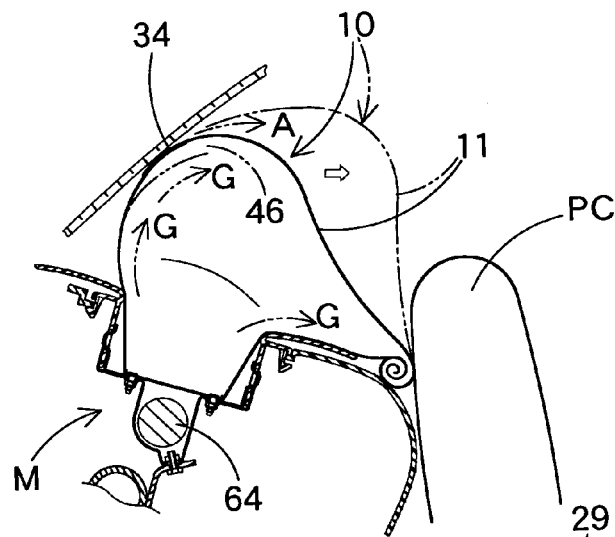
FIGS. 18A to 18C illustrate behaviors of the activated airbag of FIG. 3 in order, in a case the airbag engages a passenger halfway of inflation.
Figure 18B:
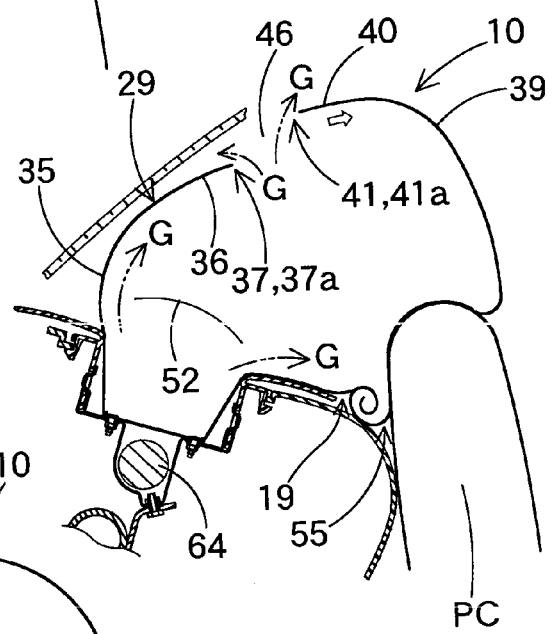
Figure 18C:
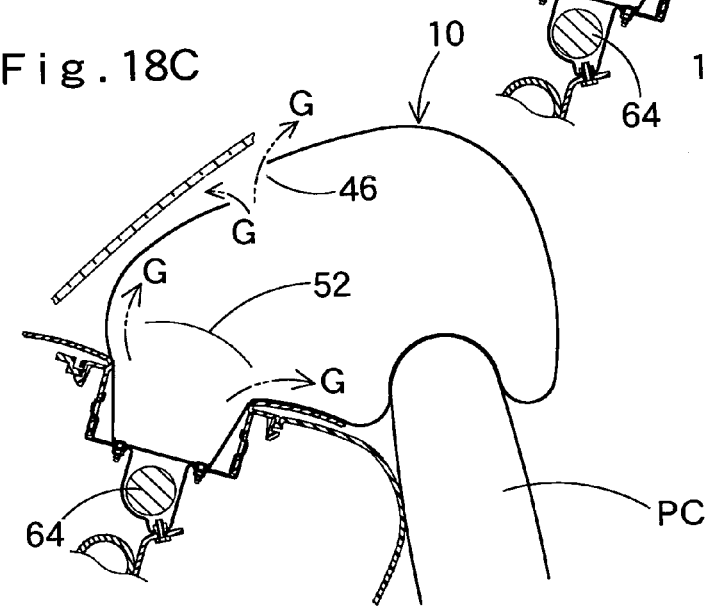

When the airbag 10 bumps against a passenger PC positioned close-by the airbag 10 halfway of inflation, as shown in FIGS. 18A and 18B, because of slight increase of internal pressure the airbag 10 and stagnation of stream of inflation gas G, the air A stops flowing in the airbag 10. Then with the opening condition of the communication port 46 maintained, the airbag 10 exhausts inflation gas G from the communication port 46, as shown in FIGS. 18B and 18C. Consequently, increase of internal pressure is suppressed, so that the airbag 10 does not apply unnecessary pressure to the close-by passenger PC.

Therefore, the airbag 10 completes inflation quickly, and suppresses increase of internal pressure in engaging the close-by passenger PC halfway of inflation.

According to the foregoing embodiment, since the lap portion 34 is located apart from an area of the airbag 10 to engage the passenger PN or PC, the communication port 46 is not closed by the passenger PN/PC, so that exhaustion of inflation gas G is not hindered. Consequently, even if the airbag 10 bumps against the close-by passenger PC halfway of inflation, inflation gas G is exhausted from the communication port 46, so that the increase of internal pressure of the airbag 10 is smoothly suppressed.

In the foregoing embodiment, moreover, the passenger side wall 11 as recipient wall, which contacts with the passenger PN for protecting the same when the airbag 10 is completely inflated, is located in an end plane of airbag circumferential wall, or in stream terminal of inflation gas G. The lap portion 34 is located in the cylindrical wall 18 which is in upperstream of inflation gas a than an outer edge of the passenger side wall 11. In addition, the edges 37 and 41 of the terminal portions 36 and 40, which constitute the lap portion 34, of the upstream and downstream side base cloths 35 and 39 are generally parallel to a plane of the passenger side wall 11.

That is, in order to exhaust inflation gas G, the communication port 46 desirably opens by separation of center portions 37a and 41a. The center portion 37a/41a is located in the center of the edge 37/41 of the terminal portion 36/40 of the upstream/downstream side base cloth 35/39 between the joined portions 43 and 44 of the lap portion 34. With this construction, when the recipient wall or passenger side wall 11 located in stream terminal of inflation gas G engages the close-by passenger PC as target object of protection halfway of inflation and unfolding of the airbag 10, dent of the recipient wall 11 causes partial tension force in the upper wall 29 where the lap portion 34 is located, as shown in FIG. 18B, the tension force exerting in perpendicular to the plane of the recipient wall 11. This direction of the tension force is generally perpendicular to the edges 37 and 41 of the terminal portions 36 and 40 of the upstream and downstream side base cloths 35 and 39, and is generally consistent with a separating direction of the center portions 37a and 41a of the edges 37 and 41. Accordingly, an open state of the communication port 46 is stably maintained, so that inflation gas G is smoothly exhausted from the communication port 46, as shown in FIG. 18C. As a result, the airbag 10 does not apply strong pressure to the close-by passenger PC.

The airbag 10 according to the present invention includes an inlet port 20 for admitting inflation gas G. The inlet port 20 is stream origin of inflation gas G. The airbag 10 further includes a flow regulating cloth 52 for delivering inflation gas G flown in via the inlet port 20 toward the downstream side base cloth 39 from the upstream side base cloth 35, in the lap portion 34. In other words, in the airbag 10, inflation gas G emitted out of the outlet port 52a of the flow regulating cloth 52 open forward is once directed forward, and then reversed to orient rearward from front side in the upper wall 29 of the cylindrical wall 18, i.e., toward the downstream side base cloth 39 from the upstream side base cloth 35. This enhances the ejector action of inflation gas G, so that the airbag 10 admits air A from the atmosphere via the communication port 46 even more swiftly.

The airbag 10 according to the present invention is used for the airbag device M for front passenger's seat mounted on the dashboard 1 in front of front passenger's seat. The airbag 10 includes the passenger side wall 11 and the cylindrical wall 18. When the airbag 10 is completely inflated, the passenger side wall 11 is deployed generally vertically in a rear side of the airbag 10, and contacts with a passenger for protecting the same. The cylindrical wall 18, as the airbag 10 is completely inflated, has a shape converging forward from outer circumference of the passenger side wall 11, and is deployed between front wind shield W and the top face 1a of the dashboard 1. The cylindrical wall 18 includes the inlet port 20 of inflation gas G in the vicinity of its foremost portion in the lower wall 19. In the airbag 10, the edges 37 and 41 of the terminal portions 36 and 40 of the upstream and downstream side base cloths 35 and 39 are disposed along left-right direction of the airbag 10 as completely inflated. The edge 41 of the terminal portion 40 of the downstream side base cloth 39 is located forward of the edge 37 of the terminal portion 36 of the upstream side base cloth 35. The lap portion 34 is located in a portion of the upper wall 29 of the cylindrical wall 18 that contacts a wind shield W when the airbag 10 is completely inflated. Accordingly, when the airbag 10 is completely inflated, the lap portion 34 contacts the wind shield W and is held down by the wind shield W, as shown in FIG. 17B. As a result, the communication port 46 is stably closed with the terminal portions 36 and 40 of the upstream and downstream side base cloths 35 and 39 attached to each other, because of internal pressure of the airbag 10, too. Therefore, the airbag 10 stably prevents leakage of inflation gas G from the communication port 46 when completely inflated.

Moreover, in the lap portion 34, the edges 37 and 41 of the terminal portions 36 and 40 of the upstream and downstream side base cloths 35 and 39 are disposed along left-right direction of the airbag 10 as completely inflated. The edge 41 of the terminal portion 40 of the downstream side base cloth 39 is located forward of the edge 37 of the terminal portion 36 of the upstream side base cloth 35. Accordingly, if the airbag 10 engages the passenger PC positioned close-by the airbag 10 when still not contacting the wind shield W halfway of inflation and inflation, partial tension force occurs firstly in the upper wall 29 where the lap portion 34 is located, as shown in FIGS. 18B and 18C. The tension force works in front-rear direction, which is generally perpendicular to the edges 37 and 41 of the terminal portions 36 and 40 of the upstream and downstream side base cloths 35 and 39. That is, the tension force serves to keep the communication port 46 open. In other words, the working direction of the tension force is generally consistent with a separating direction of the center portions 37a and 41a of the edges 37 and 41. Accordingly, an open state of the communication port 46 is stably maintained, so that inflation gas G is smoothly exhausted from the communication port 46.

Figure 14A:
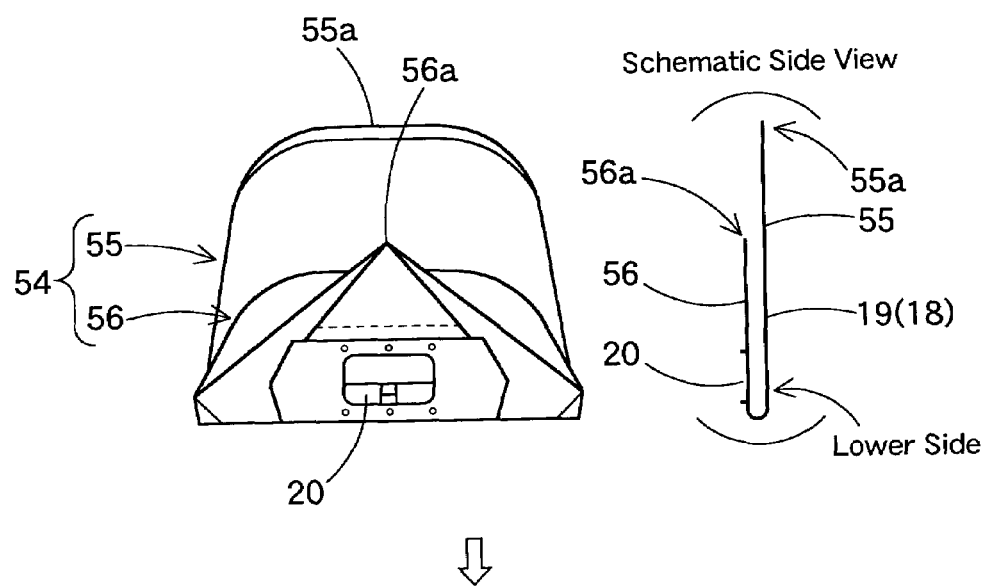
FIGS. 14A and 14B illustrate folding process of the airbag of FIG. 3 after the preparatory folding step.
Figure 14B:
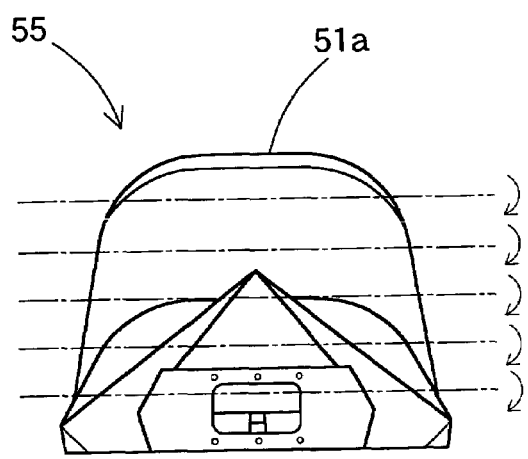

Moreover, in the airbag 10 for front passenger's seat according to the invention, roll-folding is adopted in the transverse folding step of the folding process. The roll-folding of the foregoing embodiment is, as shown in FIGS. 14B and 15A, to bring the rear portion 55 in the vicinity of the lower edge 13 of the passenger side wall 11 close to the inlet port 20 in the lower side of the lower wall 19 of the cylindrical wall 18.

Unfolding of the roll-folded portion 55 is subjected to more resistance than unfolding of bellows-folding. In addition, the lap portion 34 is located in the upper wall 29 apart from the lower wall 19 where the roll-folded portion 55 is located. Accordingly, during inflation of the airbag 10 accompanied by the unfolding of the roll-folding, a tension force working in front-rear direction is more likely to occur in the upper wall 29, as shown in FIG. 16B. This working direction of the tension force is consistent with a separating direction of the center portions 37a and 41a of the edges 37 and 41 of the terminal portions 36 and 40 of the upstream and downstream side base cloths 35 and 39, and is also consistent with a direction to keep the communication port 46 open. Consequently, the airbag 10 stabilizes the open state of the communication port 46 from the beginning to completion of the unfolding, or from the beginning to completion of airbag inflation. Therefore, the airbag 10 stably secures inflow of the air A thereinto in the course of inflation.

This open state of the communication port 46 differs from the open state of the same in a case that the airbag 10 engages the target object of protection PC halfway of inflation. FIGS. 16B and 18B illustrate the contrast. That is, the lap amount LR of the terminal portions 36 and 40 of the upstream and downstream side base cloths 35 and 39 in the lap portion 34 is so predetermined that the ejector action may be caused when inflation gas G flows along the upstream side base cloth 35 and then along the downstream side base cloth 39 for the air A to be sucked into the airbag 10 via the communication port 46. This arrangement maintains a generally uniform open state of the communication port 46 from the beginning to completion of the unfolding of the airbag 10. Therefore, in the normal deployment process, the airbag 10 does not allow inflation gas G to flow out of the communication port 46, as shown in FIG. 16B. As shown in FIG. 18B, in contrast, when the airbag 10 engages the target object of protection PC halfway of inflation, flow of inflation gas G is stopped, and the ejector action to suck in the air A is stopped, too, so that the airbag 10 allows inflation gas G to flow out of the communication port 46.

In the airbag 10, the edges 37 and 41 of the terminal portions 36 and 40 of the upstream and downstream side base cloths 35 and 39 in the lap portion 34 are arranged along left-right direction of the airbag 10 as completely inflated up to the vicinity of the left and right edges 29b and 29c of the upper wall portion 29 extending downward.

With this construction, although the communication port 46 is opened widely with the centers 37a and 41a of the terminal portions 37 and 41 separated in front-rear direction for introducing the air A into the airbag 10 during airbag inflation, the airbag 10 is able to close the port 46 smoothly right before completion of airbag inflation, as shown in FIG. 17A.

Figure 19A:
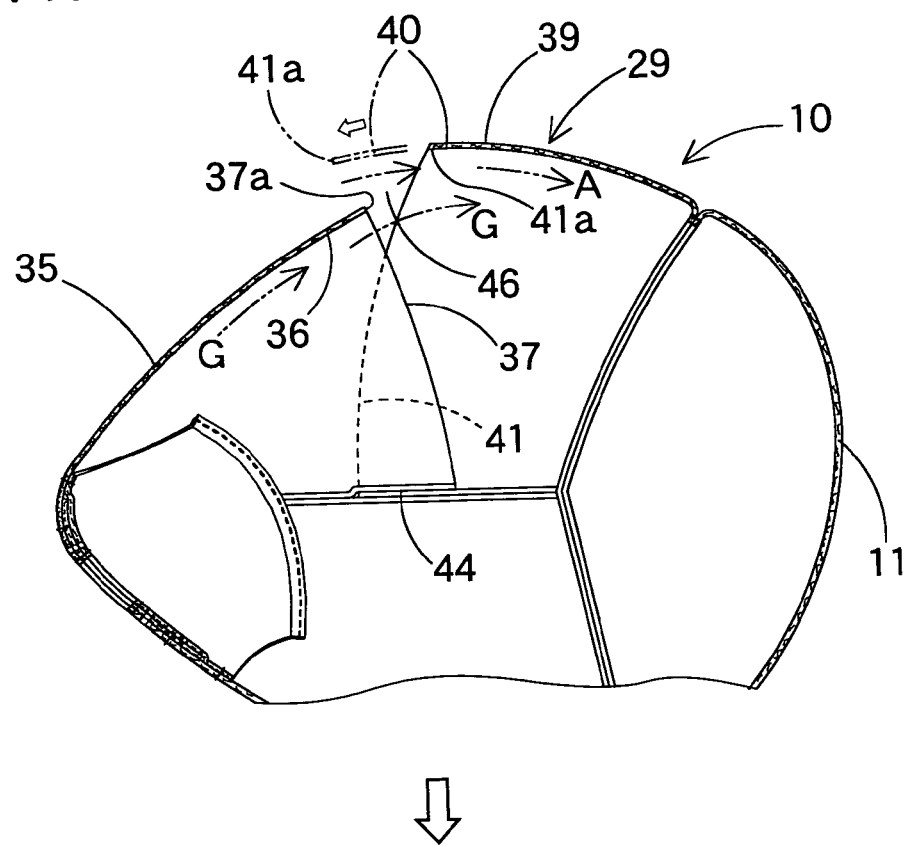
FIGS. 19A and 19B illustrate a closing process of a communication port of the airbag of FIG. 3.
Figure 19B:
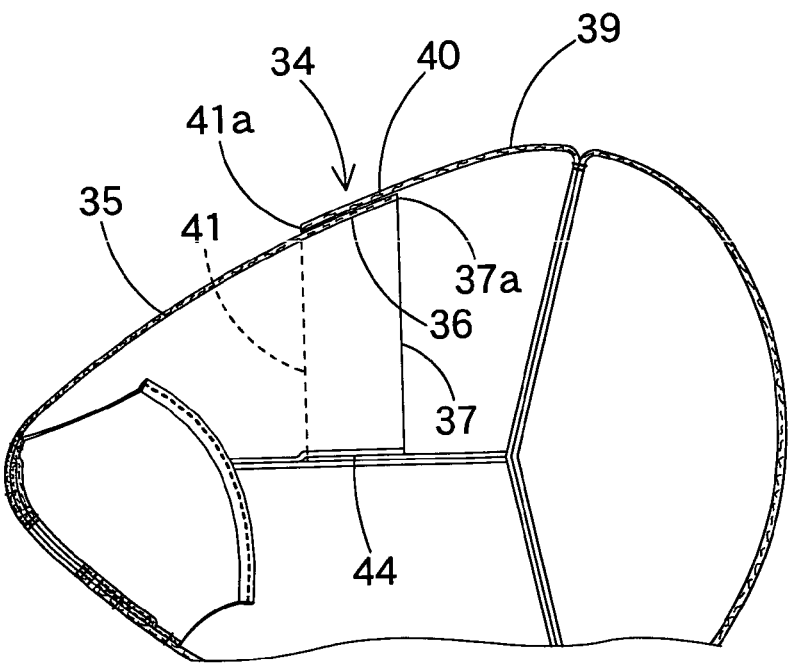

More specifically, as a tension force starts to be generated in the whole circumferential wall of the airbag 10 right before completion of airbag inflation, a tension force working in left-right direction is applied to marginal portions of the communication port 46 which had been separated in front-rear direction. This tension force in left-right direction works such that the terminal portion 40 of the downstream side base cloth 39 caps, or covers over the terminal portion 36 of the upstream side base cloth 35, thereby closing the communication port 46. At this time, as shown in FIGS. 3 and 4, the left and right joined portions 43 and 44 of the downstream and upstream side base cloths 35 and 39 in the lap portion 34 are disposed in the vicinity of the left and right edges 29b and 29c of the upper wall 29, respectively, while the terminal portions 36 and 40 of the downstream and upstream side base cloths 35 and 39 have curved shapes as part of a generally spherical shell. In addition, the terminal portion 40 of the downstream side base cloth 39 is mounted around the terminal portion 36 of the upstream side base cloth 35. This construction produces the tension force working in left-right direction in the marginal portions of the communication port 46. As shown in FIGS. 17A, 19A and 19B accordingly, when the communication port 46 is closed, the terminal portion 40 of the downstream side base cloth 39 rotates forward around the left and right joined portions 43 and 44 and covers the terminal portion 36 of the upstream side base cloth 35. As a result, the terminal portion 40 of the downstream side base cloth 39 smoothly closes the communication port 46.

In the preparatory folding step of the airbag 10, the upper edge vicinity portion 16 of the passenger side wall 11 is disposed above the inlet port 20 or in a position to confront the inlet port 20. Accordingly, the portion 16 confronting the inlet port 20 is pushed up intensely by a pressure F (refer to FIGS. 11 to 13) caused by inflation gas G having just flown in, prior to other portions of the passenger side wall 11 such as a portion near the lower edge 13. As a result, the passenger side wall 11, thereafter, is easily disposed generally vertically. In the foregoing embodiment, the pressure F of inflation gas G works on the upper edge vicinity portion 16 of the passenger side wall 11 in a condition that the valley-folded portions 32 of the flow regulating cloth 52 and of the cylindrical wall 18, the upper edge vicinity portion. 30 or the intermediate portion 29a in the cylindrical wall 18, and left and right intermediate portions 23a and 24a in the cylindrical wall 18 are interposed therebetween.

This intense lifting of the upper edge vicinity portion 16 of the passenger side wall 11 contributes to quick unfolding of the airbag 10 in vertical and transverse directions, and also contributes to quick development of the passenger side wall 11.

Therefore, the airbag 10 according to the present invention quickly deploys the passenger side wall 11, which becomes generally perpendicular to the inlet port periphery 21 upon airbag deployment, generally vertically. Moreover, the airbag 10 deploys the passenger side wall 11 in a widely developed state so as not to apply partial pressure to a passenger side.

In the foregoing embodiment, furthermore, the cylindrical wall 18 is folded such that an entire area of the passenger side wall 11 is flatly developed in the preparatory folding step of the airbag 10. That is, since the passenger side wall 11 is not folded-up, the preparatory folding step is facilitated. Moreover, since the entire area of the passenger side wall 11 is flatly developed in the preparatory folding step, the airbag 10 in deployment shifts toward the passenger side more easily in a widely developed state in front-rear and left-right directions than a case in which the passenger side wall 11 is folded-up. Consequently, moving speed of the passenger side wall 11 toward the passenger side is even more suppressed.

In the foregoing embodiment, in the preparatory folding step of the cylindrical wall 18, the left portion 23 and right portion 24 of the gas inlet port 20 are folded in on the folds CL and CR extending in front-rear direction such that the intermediate portions 23a and 24a of the left and right portions 23 and 24 between the inlet port 20 and the left and right edges 14 and 15 of the flatly developed passenger side wall 11 are brought close to the gas inlet port 20, and are arranged at side of the passenger sidewall 11 in the gas inlet port periphery 21. The portion 30 of the cylindrical wall 18 near the upper edge 12 of the passenger side wall 11 is folded in on the valley fold CH extending along left-right direction. That is, since the cylindrical wall 18 is folded up symmetrically with respect to the inlet port 20, the preparatory folding work of the airbag 10 is facilitated.

Especially, this folded configuration of the cylindrical wall 18 is easily formed by gripping the grip portions 31 and 26a and pulling the portions 31 and 26a in front and rear directions to separate them. Accordingly, the preparatory folding work of the airbag 10 is even more facilitated. The grip portion 31 is located in a generally intermediate position between a transverse center of the front edge 21a of the gas inlet port 20 and a transverse center of the passenger side wall upper edge 12 in the cylindrical wall 18. The grip portion 26a is located in the vicinity of a transverse center of the rear portion 26 of the gas inlet port 20 in the cylindrical wall 18.

According to the airbag 10 of the present invention, when the flow regulating cloth 52 bulges upward after inflation gas G flows in via the inlet port 20 and pushes up the upper edge vicinity portion 16 of the passenger side wall 11, the inflation gas G butts against the cloth 52 and is divided into gas GF directed forward of vehicle and gas GB directed rearward, as shown in FIG. 4. At this time, the flow regulating cloth 52 is formed into a curved shape bulging toward a direction away from the inlet port 20 in a section taken along front-rear direction of vehicle in the inlet port 20 upon inflow of inflation gas G. Accordingly, the inflation gas GB, or a branch of inflation gas G flown in via the inlet port 20 and butted against a portion of the cloth 52 confronting the inlet port 20, is guided by the curvature of the cloth 52 and redirected toward the top face 1a of the dashboard 1, not in parallel with the dashboard top face 1a, thereby developing the airbag 10. Consequently, the folded portion 55 of the airbag 10 heads rearward along the top face 1a of the dashboard 1, so that the airbag 10 further widens the passenger side wall 11.

After the preparatory folding, in the foregoing embodiment, the airbag 10 goes through the transverse folding first, and then goes through the vertical folding, before being completely folded up. However, the transverse folding may be conducted after the vertical folding, or alternatively, the vertical folding may be interposed in the course of the transverse folding and then the transverse folding may be restarted to complete the folding work. Further alternatively, the transverse folding may be interposed in the course of the vertical folding after the preparatory folding, and then the vertical folding may be restarted to complete the folding work.

Figure 20:
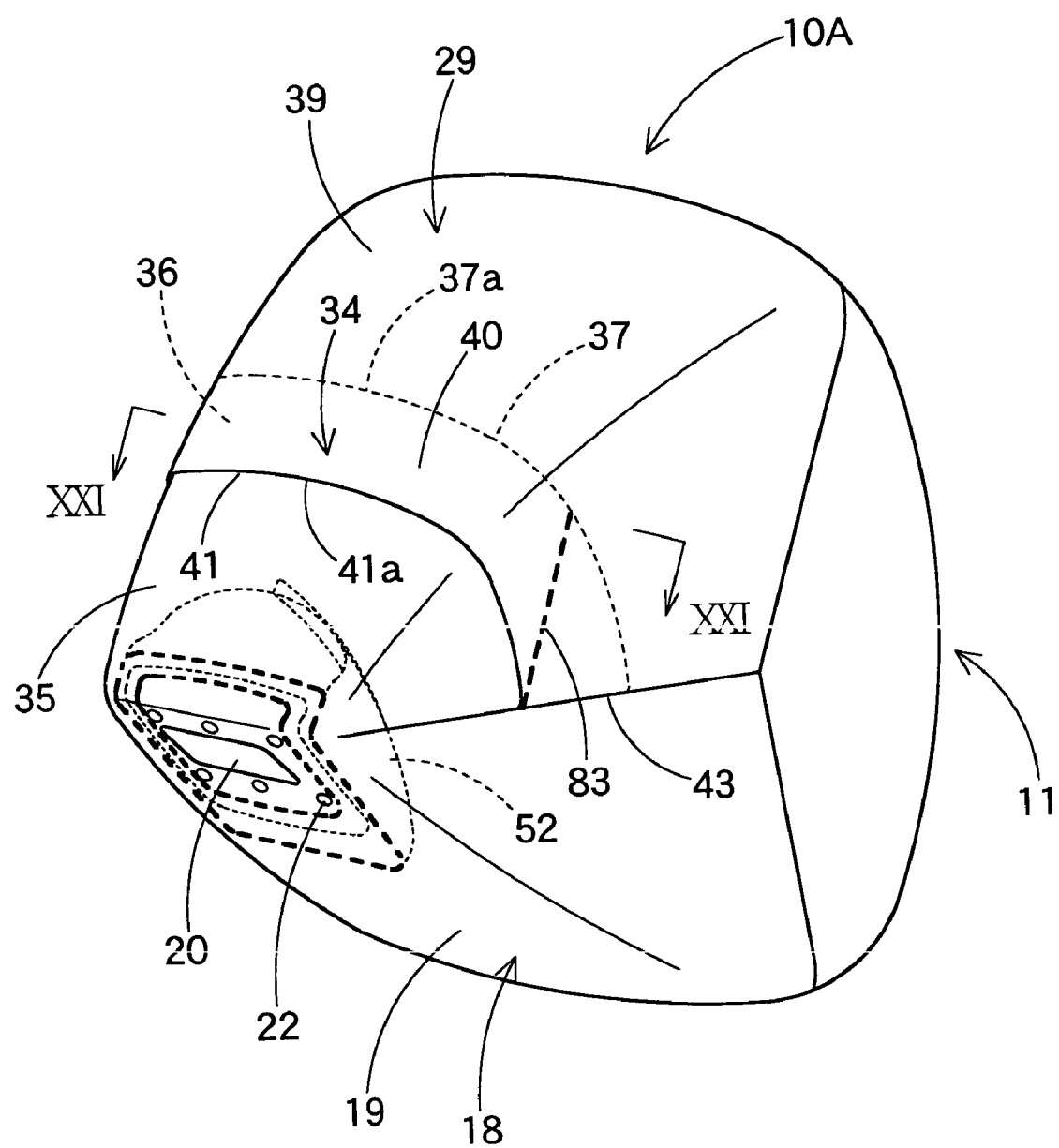
FIG. 20 is a perspective view of another embodiment of the airbag of the present invention.
Figure 21:
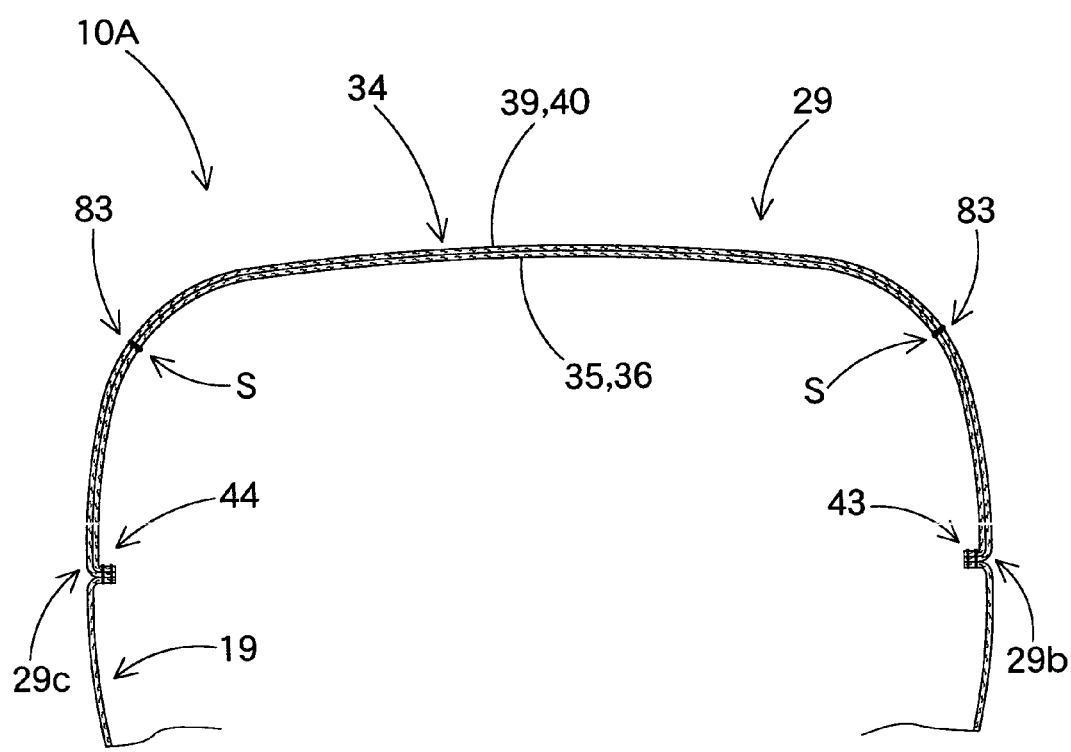
FIG. 21 is a partial section of the airbag of FIG. 20, taken along line XXI-XXI of FIG. 20.
Figure 22A:
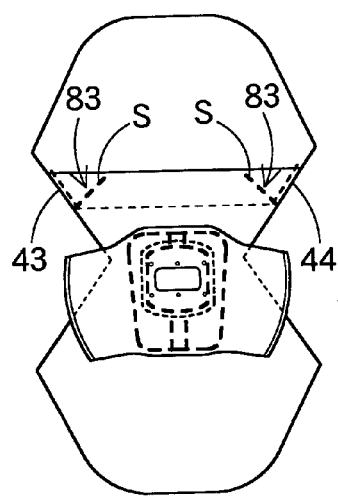
FIGS. 22A to 22E illustrate a manufacturing process of the airbag of FIG. 20.
Figure 22B:
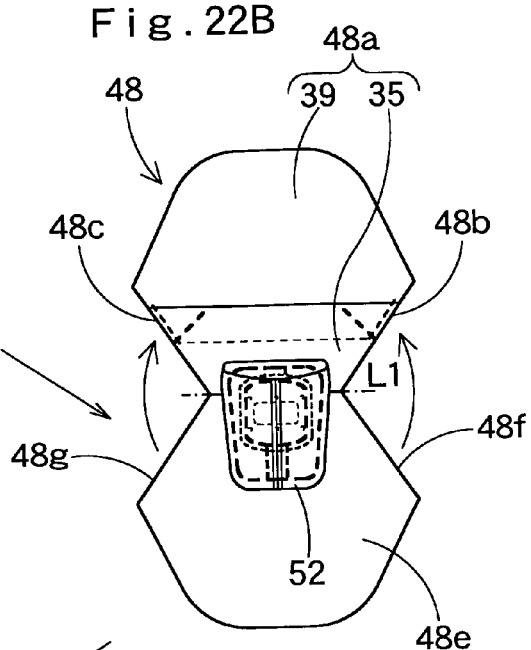
Figure 22C:
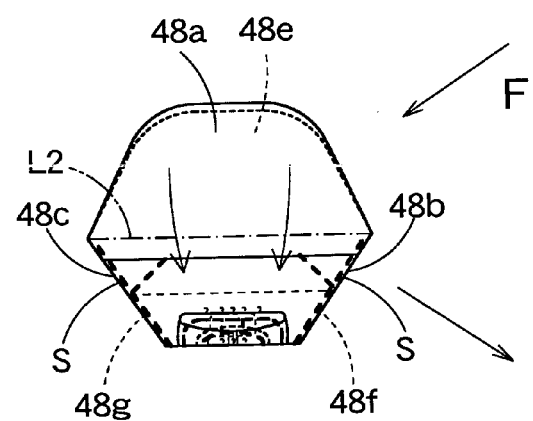
Figure 22D:
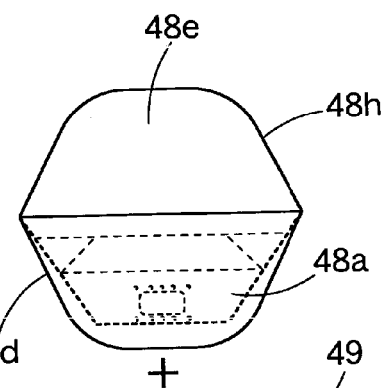
Figure 22E:
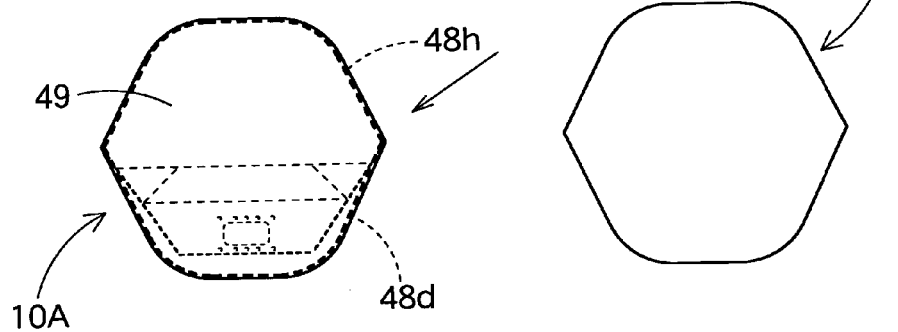

In consideration of receiving a passenger PN after completion of inflation and so on, it will also be appreciated to adopt an airbag 10A shown in FIGS. 20 to 22 having improved strength of the joined portions 43 and 44 of the lap portion 34. The airbag 10A includes additional joined portions 83 in inner sides of the joined portions 43 and 44 of the airbag 10. The joined portions 83 are formed by sewing up the terminal portions 36 and 40 of the upstream and downstream side base cloths 35 and 39 with sewing yarn S, at the same time as the joined portions 43 and 44 when the upstream and downstream side base cloths 35 and 39 are joined, as shown in FIG. 22. With this construction, the joined portions 43 and 83 and the joined portions 44 and 83, which join the upstream and downstream side base cloths 35 and 39, are respectively disposed double in a generally left-right direction in left and right sides of the lap portion 34. Accordingly, strength of the joined portions 43 and 44 of the lap portion 34 is improved. For instance, when receiving a passenger PN having high kinetic energy after being completely inflated, even if the inner joined portions 83 are broken, the airbag 10A maintains the joined state of the upstream and downstream side base cloths 35 and 39 by the outer joined portions 43 and 44. As a result, the airbag 10A prevents gas leakage from the vicinity of the joined portions 43 and 44 or from the marginal portions of the communication port 46 caused by breakage.

Figure 23:
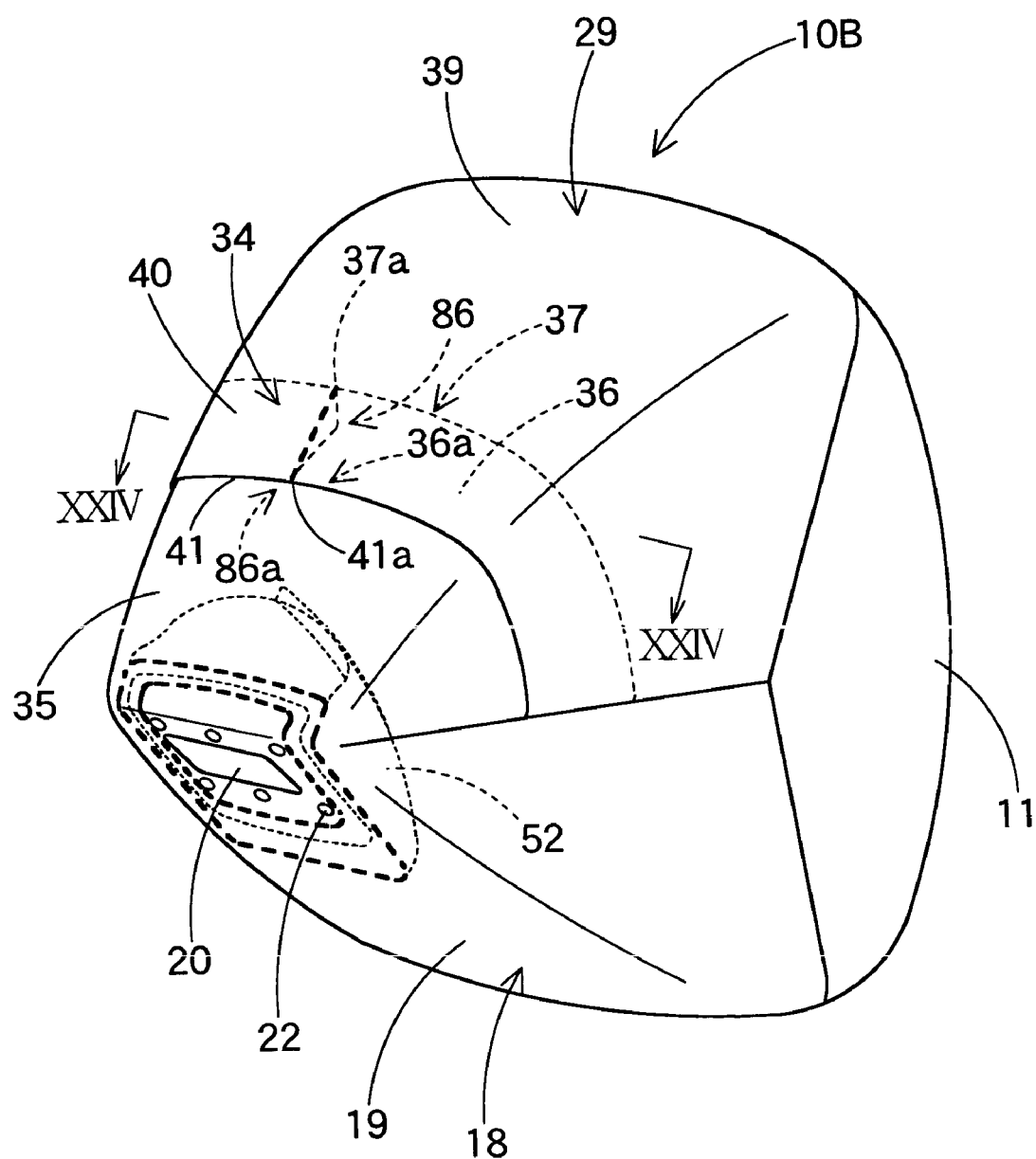
FIG. 23 is a perspective view of still another embodiment of the airbag of the present invention.
Figure 24:
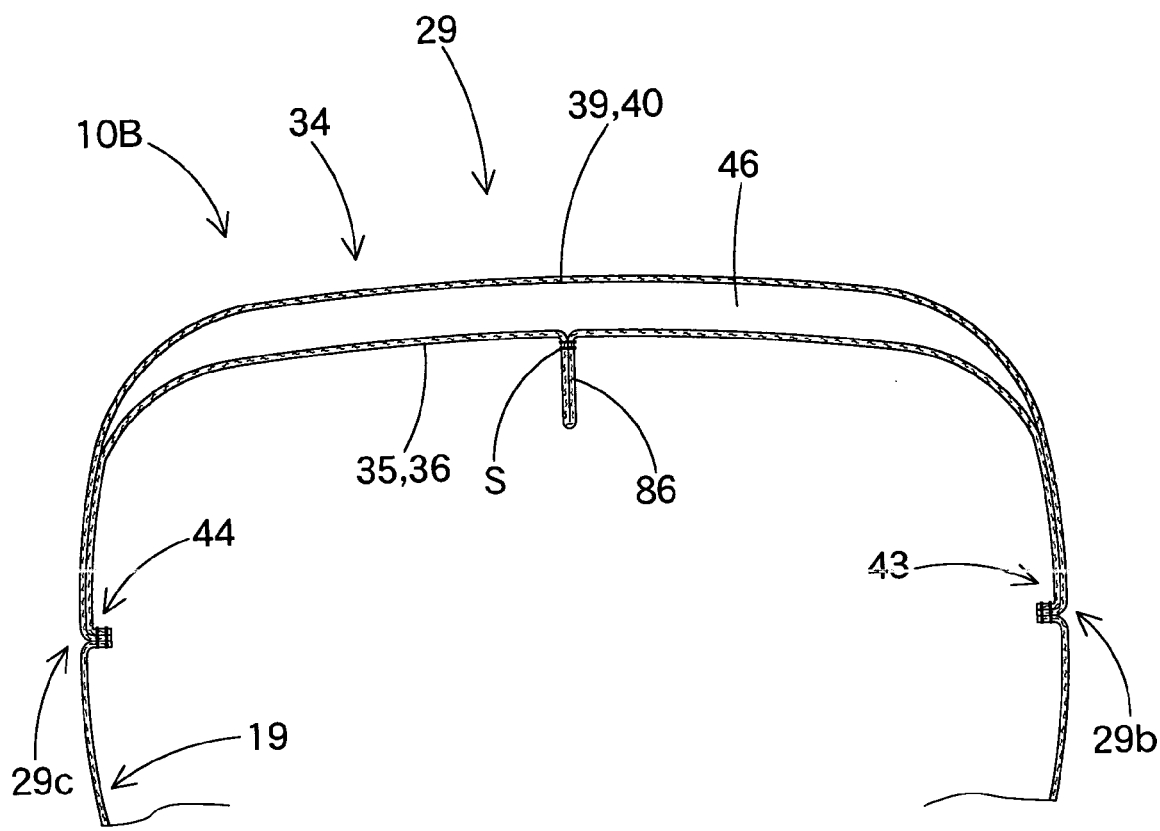
FIG. 24 is a partial section of the airbag of FIG. 23, taken along line XXIV-XXIV of FIG. 23.

The airbag may be provided with a tuck 86 sewn up by sewing yarn S, for enlarging an opening shape of the communication port 46, in the center 37a of the edge 37 in the terminal portion 36 of the upstream side base cloth 35, as in an airbag 10B shown in FIGS. 23 and 24. A front edge 86a vicinity of the tuck 86 is located in a position where the center 41a of the edge 41 of the downstream side base cloth 39 is deployed when the lap portion 34 contacts with the wind shield upon completion of inflation of the airbag 10B. With this construction, when the lap portion 34 contacts with the wind shield upon completion of inflation of the airbag 10B, the center 41a of the edge 41 of the downstream side base cloth 39 is pressed onto a portion 36a of the terminal portion 36 of the upstream side base cloth 35 and in the vicinity of the tuck's front edge 86a but not a part of the tuck 86. In the airbag 10B, the terminal portion 36 of the upstream side base cloth 35 has a shorter transverse length because of the tuck 86, in a range up to the edge 37.

This enlarges a clearance between the edge centers 37a and 41a when the communication port 46 is opened, so that the lap portion 34 secures a wide opening area of the communication port 46. Since the edge 41 of the terminal portion 40 of the downstream side base cloth 39 is pressed by the wind shield onto the portion 36a in the terminal portion 36 when the communication port 46 is closing, the communication port 46 is closed so that leakage of inflation gas G is prevented.

Figure 25:
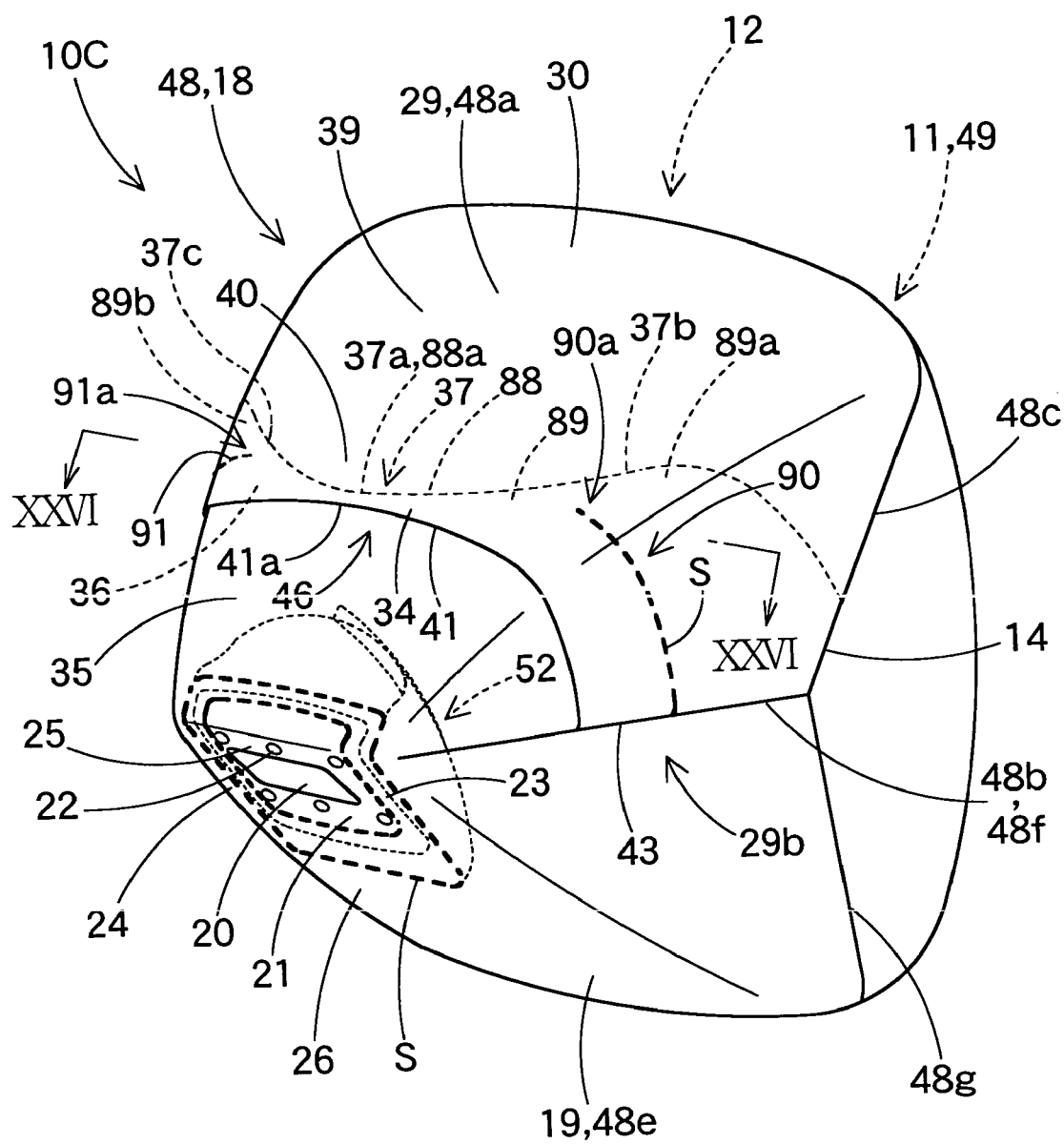
FIG. 25 is a perspective view of yet another embodiment of the airbag of the present invention.
Figure 26:
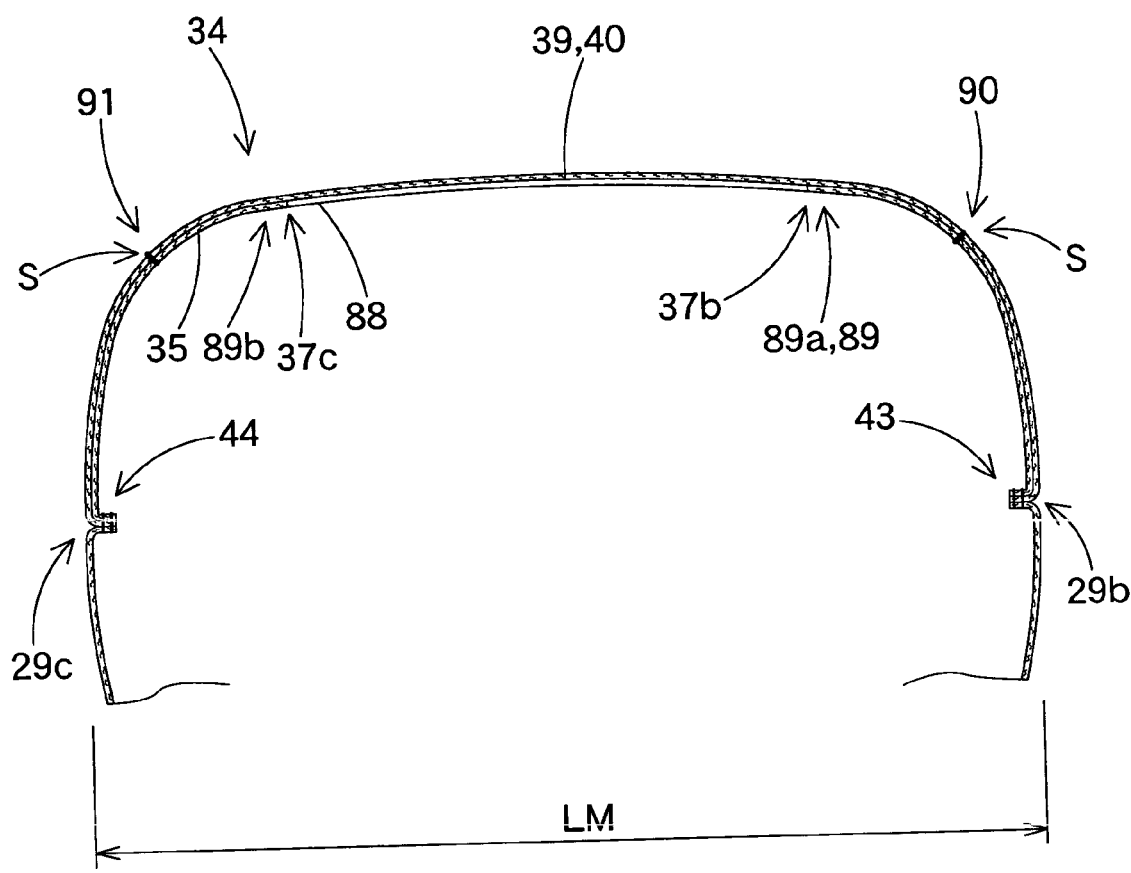
FIG. 26 is a partial section of the airbag of FIG. 25, taken along line XXVI-XXVI of FIG. 25.
Figure 27:
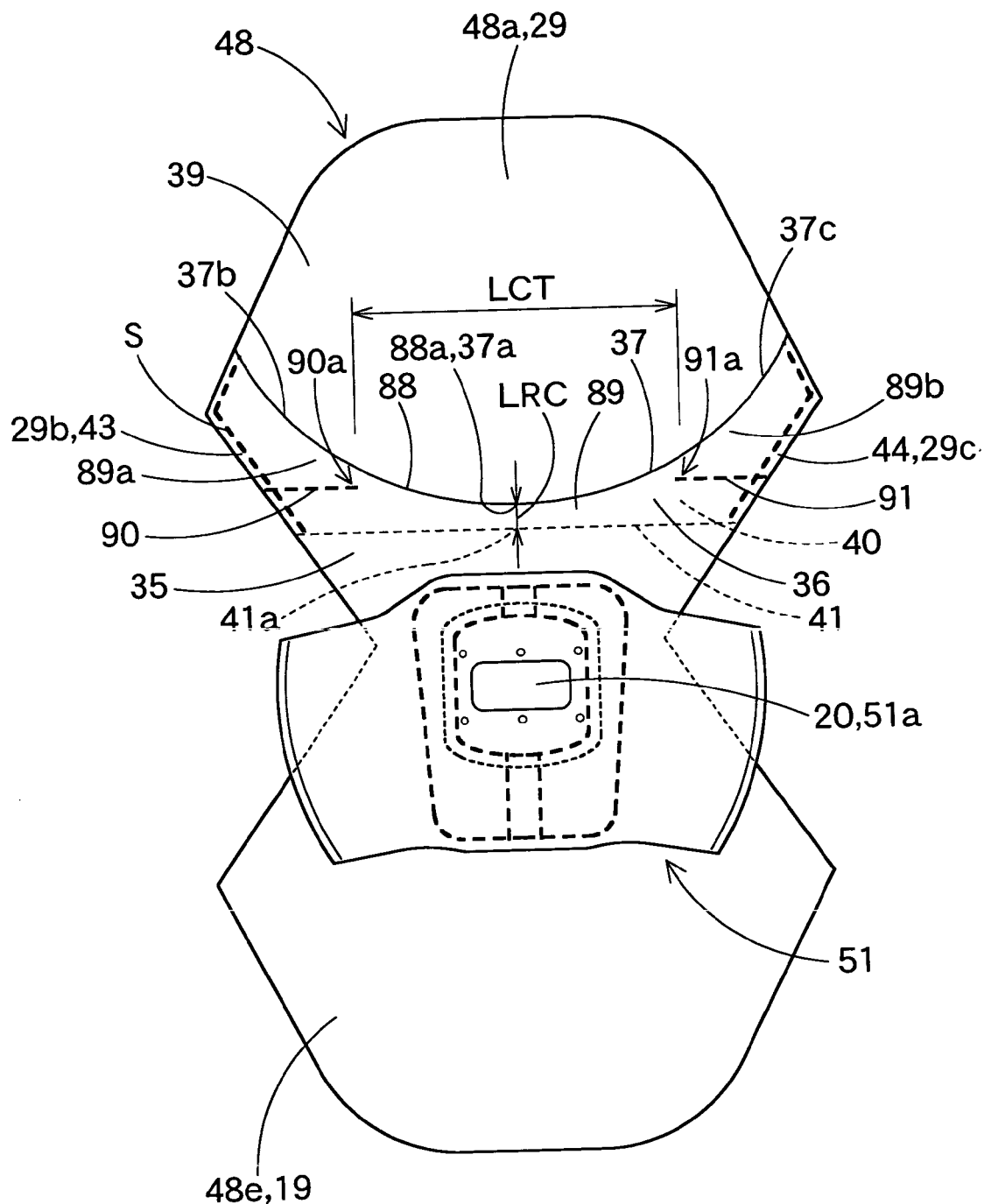
FIG. 27 is a development of the airbag of FIG. 25 under manufacture.

Furthermore, the airbag may be constructed as an airbag 10C shown in FIGS. 25 to 27. In the lap portion 34 of the airbag 10C, an edge or rear edge 37 of the terminal portion 36 of the upstream side base cloth 35 is provided with a generally semicircular recess 88. The recess 88 locates its edge center 37a forward than its left and right edges 37b and 37c. A shape of the recess 88 is constructed such that the edge 41 of the terminal portion 40 of the downstream side base cloth 39 contacts and overlaps with the terminal portion 36 of the upstream side base cloth 35 when the lap portion 34 contacts with the wind shield W in the course of airbag inflation, so that the communication port 46 is closed also because of pressing by the wind shield W.

The lap portion 34 of the airbag 10C includes, in each of left and right sides of the terminal portions 36 and 40 of the upstream and downstream side base cloths 35 and 39, an inner joined portion 90/91 as well as the outer joined portion 43/44. Each of the joined portions 90 and 91 extends toward transverse center from left/right edge 29b/29c of the upper wall 29 of the cylindrical wall 18. As shown in FIG. 27, the inner joined portions 90 and 91 are formed by sewing work with sewing yarn S, at the same time as the joined portions 43 and 44 are formed when the upstream and downstream side base cloths 35 and 39 are joined. Leading ends or inner ends 90a and 91a of the left and right inner joined portions 90 and 91 extending toward transverse center are not so extended as to contact the recess 88 provided in the edge 37 of the upstream side base cloth 35. Moreover, as to positions in front-rear direction of the airbag 10C in a condition that the upper wall 29 of the cylindrical wall 18 is flatly developed, the leading ends or inner ends 90a and 91a are located rearward than the transverse center or the front end 88a of the recess 88, and within areas of left and right positions 89a and 89b in the recess periphery 89, the area ranging in front-rear direction.

In the airbag 10C, moreover, a distance LCT between the leading ends 90a and 91a of the left and right inner joined portions 90 and 91 directed toward the center is 200 mm, which is in a range of 100 to 300 mm, in a condition that the upper wall 29 is flatly developed. A lap amount LRC in front-rear direction between the transverse center or the front end 88a of the recess 88 (also equals to the edge center 37a) in the terminal portion 36 of the upstream side base cloth 35, and the transverse center 41a of the edge 41 in the terminal portion 40 of the downstream side base cloth 39 is 50 mm, which is in a range of 30 to 200 mm, in a condition that the upper wall 29 is flatly developed.

Volume of the airbag 10C completely inflated is on the order of 90 to 120 liter, and an utmost transverse width LM of the airbag 10C completely inflated is 600 to 850 mm.

The airbag 10C differs from the airbag 10 in having left and right edges of the upstream side base cloth 35 extending rearward and in including the recess 88 and the inner joined portions 90 and 91. Except these points, however, the airbag 10C has the same construction as the airbag 10, and is assembled into the airbag device M and mounted on vehicle, as the airbag 10.

Figure 28A:
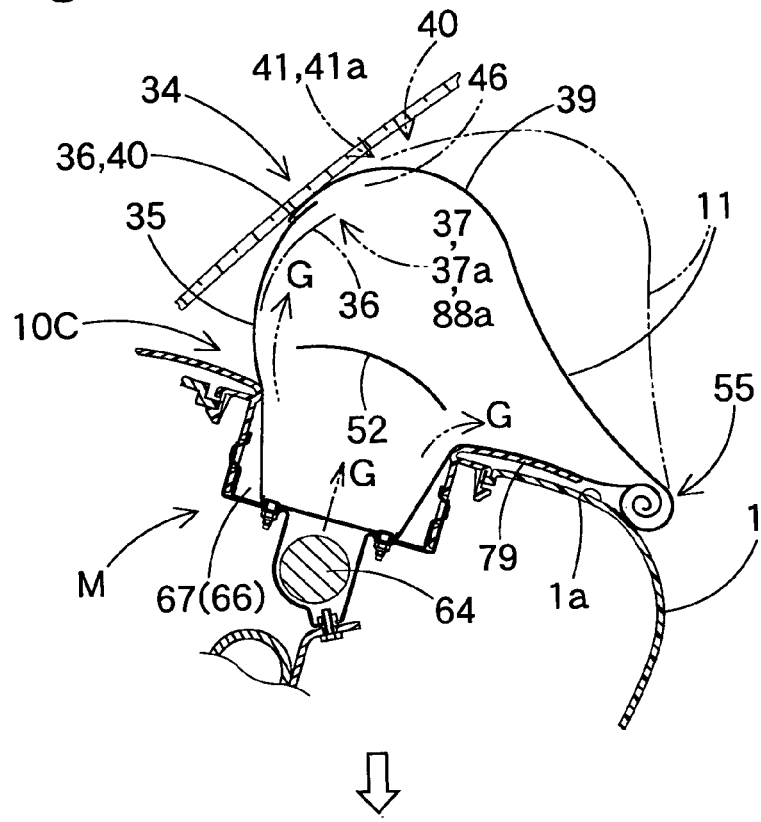
FIGS. 28A, 28B, 29A and 29B illustrate behaviors of the activated airbag of FIG. 25 in order, as viewed from side of vehicle.
Figure 28B:
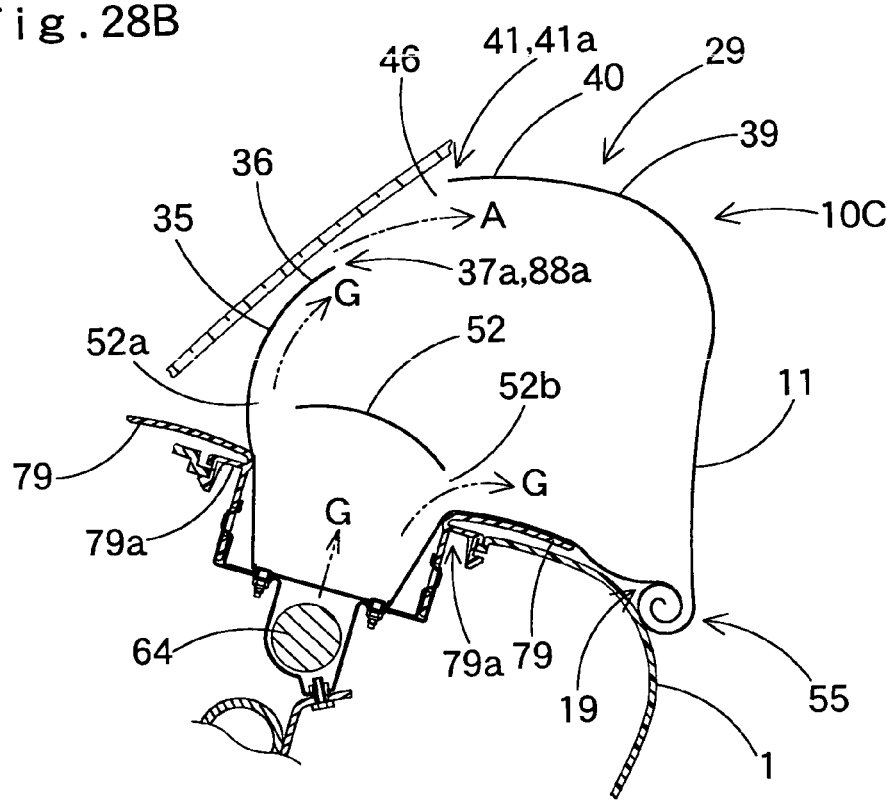
Figure 31A:
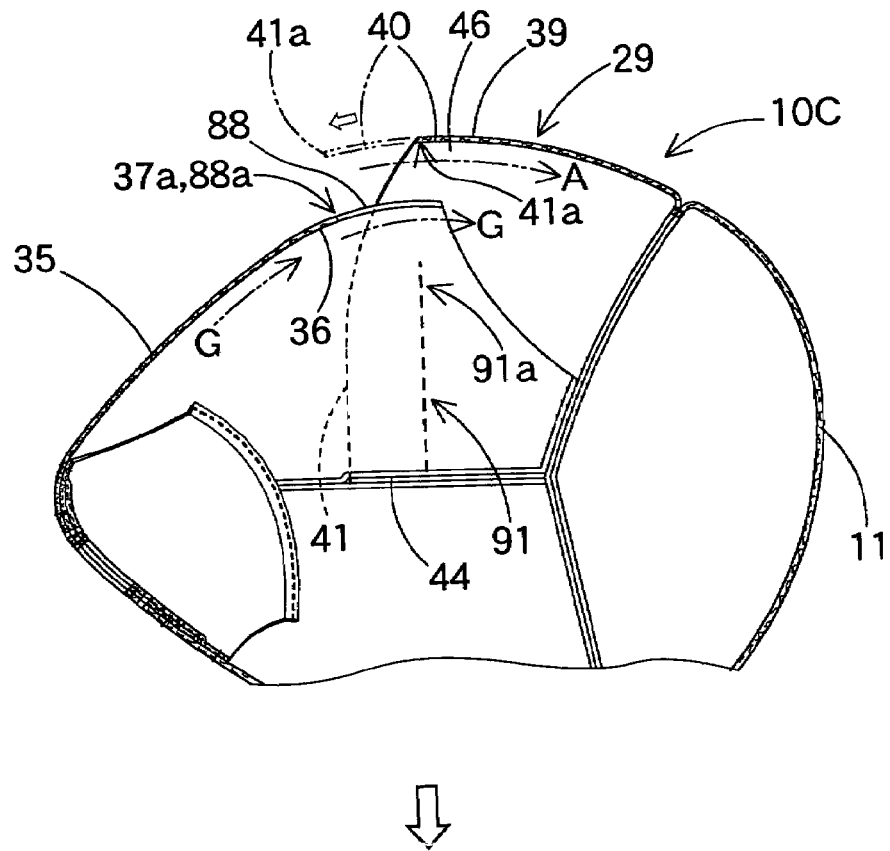
FIGS. 31A and 31B illustrate an opening state and closing state of a communication port of the airbag of FIG. 25.

In the airbag 10C, too, in the course of unfolding and inflation upon activation of the airbag device M, inflation gas G flows quickly from the upstream side base cloth 35 to the downstream side base cloth 39 of the lap portion 34, as shown in FIGS. 28A, 28B and 31A. This causes the ejector action that sucks in air A from the surrounding atmosphere, the air A outside of the airbag 10C is sucked into the airbag 10C via the communication port 46. Accordingly, inflation gas G and air A cooperatively inflate the airbag 10C quickly. The communication port 46 is now provided between the terminal portions 36 and 40 of the upstream and downstream side base cloths 35 and 39 and between the inner joined portions 90 and 91 in the lap portion 34 to establish communication between the inside and outside of the airbag 10c.

Since the lap amount LRC of the terminal portions 36 and 40 of the upstream and downstream side base cloths 35 and 39 in the lap portion 34 is less because of the recess 88, in the transverse center vicinity of the terminal portions 36 and 40, a greater clearance is provided between the edge center 37a or 88a of the upstream side base cloth 35 and the edge center 41a of the downstream side base cloth 39, when the communication port 46 is opened to suck in the air A, as shown in FIG. 31A. However, the lap amount LRC is small only in the vicinity of the center 88a of the recess 88. Since the inflation gas G is guided by the upstream side base cloth 35 and flows toward the downstream side base cloth 39, in addition, inflation gas G inside the airbag 10C does not flow out into the atmosphere via the communication port 46, so that the recess 88 does not hinder the inflation of the airbag 10C.

Figure 29A:
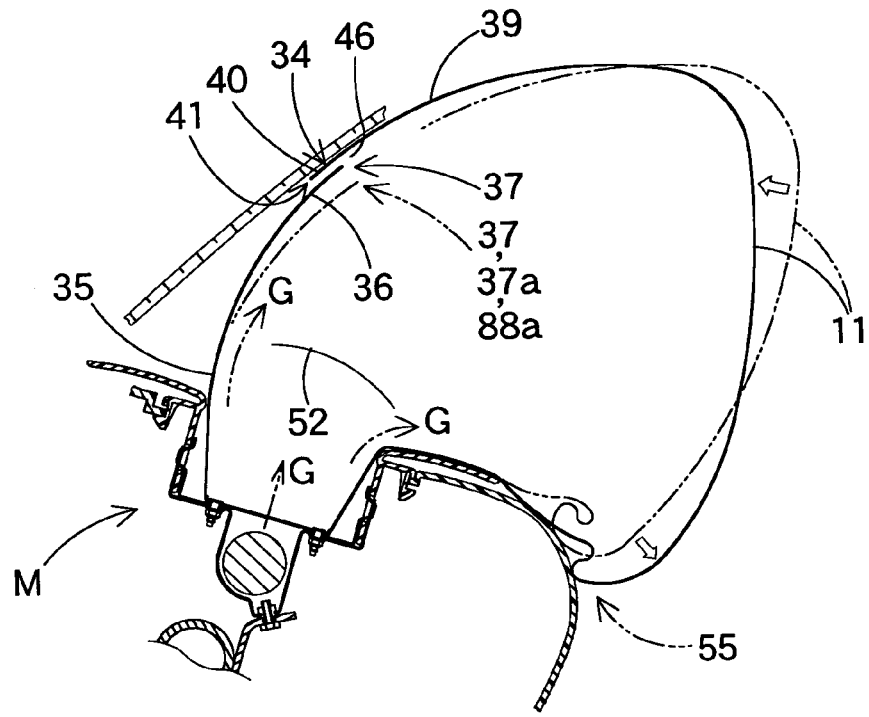
Figure 29B:
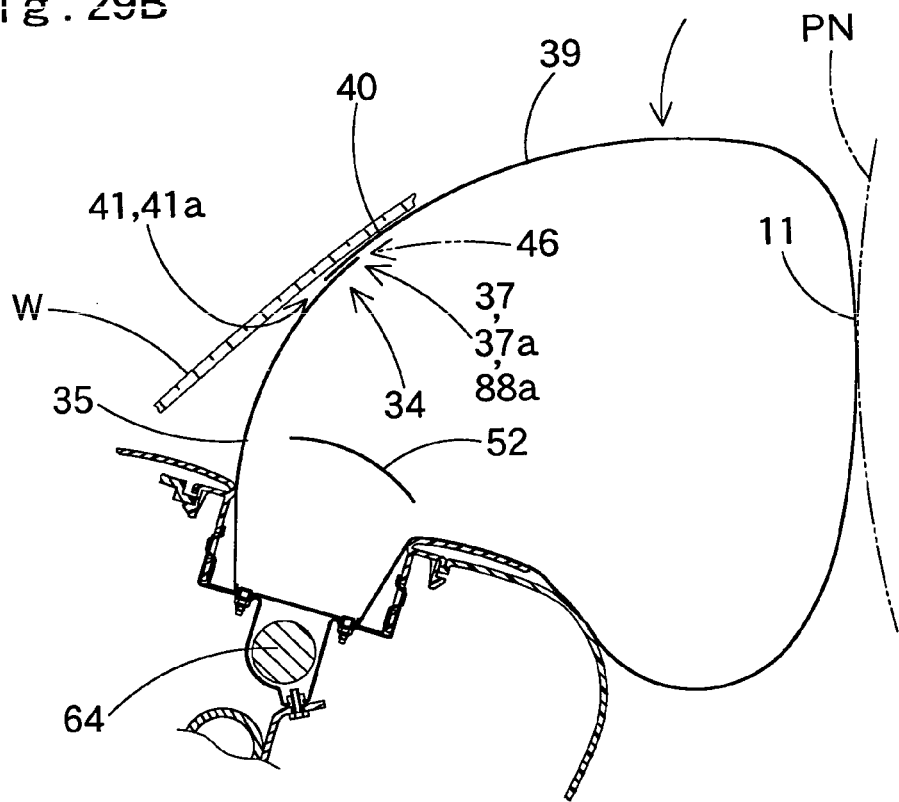
Figure 31B:
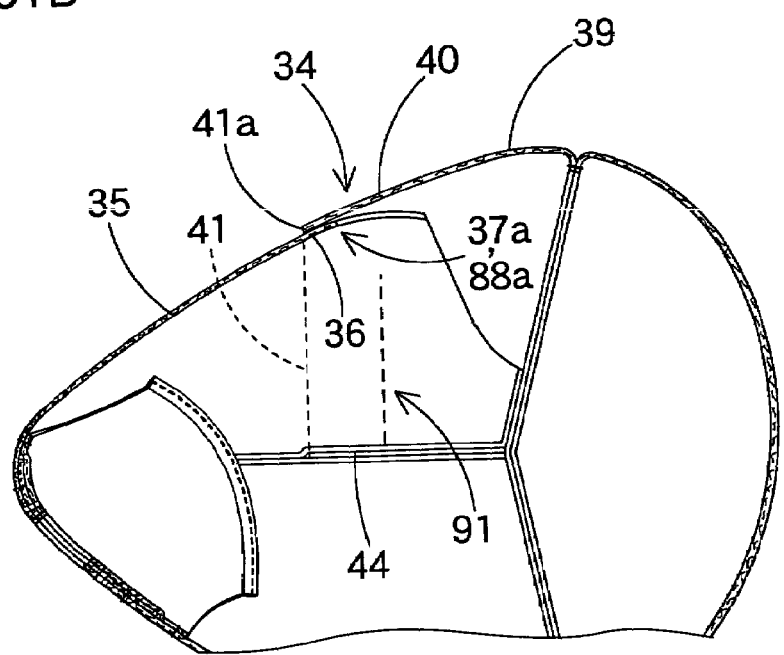

When the airbag 10C completes inflation, internal pressure of the airbag 10C brings about uniform tension in the entire circumferential wall of the airbag 10C. Because of this tension, in the lap portion 34, the terminal portion 40 of the downstream side base cloth 39 comes into contact with surface of the terminal portion 36 of the upstream side base cloth 35 with no gaps. Moreover, the terminal portion 40 of the downstream side base cloth 39 is pressed onto the terminal portion 36 of the upstream side base cloth 35 because of existence of the wind shield W. As a result, the communication port 46 is closed and leakage of inflation gas G is prevented. Accordingly, the completely inflated airbag 10C protects an approaching passenger PN by the passenger side wall 11 having cushioning property, as shown in FIGS. 29A, 29B and 31B.

Figure 30A:
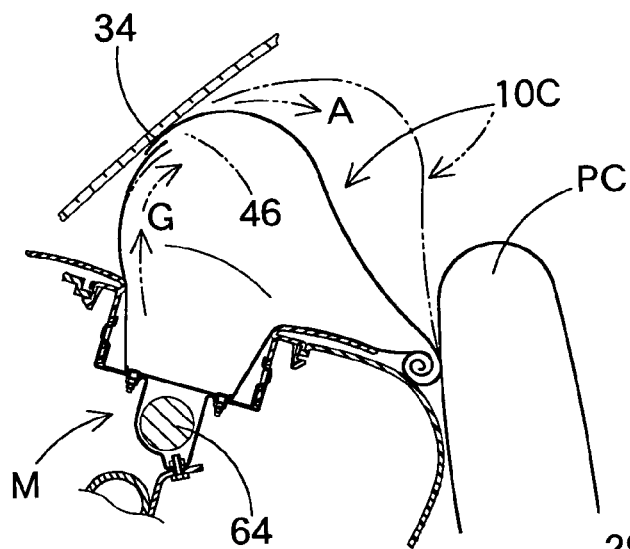
FIGS. 30A, 30B, and 30C illustrate behaviors of the activated airbag of FIG. 25 in order, in a case the airbag engages a passenger halfway of inflation.
Figure 30B:
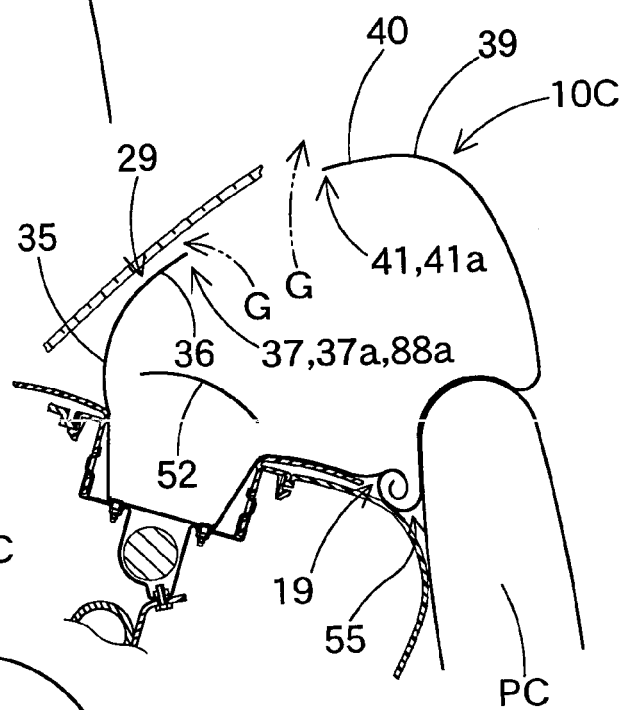
Figure 30C:
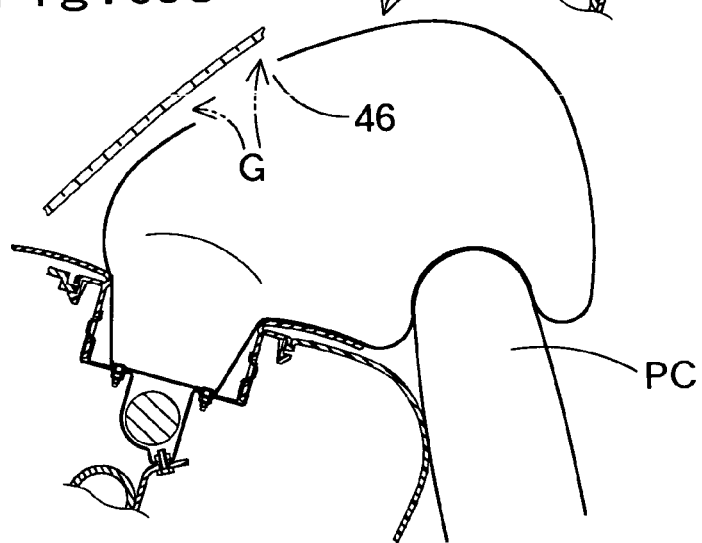

When the airbag 10C bumps against a passenger PC positioned close-by the airbag 10C halfway of inflation, as shown in FIGS. 30A and 30B, because of slight increase of the internal pressure of the airbag 10C and stagnation of stream of inflation gas G, the air A stops flowing in the airbag 10C. Then with the opening condition of the communication port 46 maintained, the airbag 10C exhausts inflation gas G from the communication port 46, as shown in FIGS. 30B and 30C. Consequently, increase of internal pressure of the airbag 10C is suppressed, so that the airbag 10C does not apply unnecessary pressure to the close-by passenger PC. Especially, in the airbag 10C, the lap amount LRC of the terminal portions 36 and 40 in the lap portion 34 is small because of the recess 88, in the transverse center vicinity of the terminal portions 36 and 40. This provides a greater clearance between the edge center 37a or 88a of the upstream side base cloth 35 and the edge center 41a of the downstream side base cloth 39, when the communication port 46 is opened, so that a great opening area is secured in the communication port 46 upon exhaustion of inflation gas G.

Furthermore, the airbag 10C includes the inner joined portions 90 and 91 each of which joins the upstream and downstream side base cloths 35 and 39 and extends toward transverse center of the upper wall 29 from the left/right edge 29b/29c. The leading end 90a/91a of the left/right inner joined portion 90/91 is not so extended as to contact the recess 88 formed in the edge 37 of the upstream side base cloth 35. Moreover, as to positions in front-rear direction of the airbag 10C in a condition that the upper wall 29 of the cylindrical wall 18 is flatly developed, the leading end 90a/91a is located rearward than the front end 88a of the recess 88.

In the airbag 10C, on one hand, because of the small lap amount LRC in the vicinity of the edge centers 37a and 41a of the terminal portions 36 and 40 in the lap portion 34, an open condition of the communication port 46 for exhausting inflation gas G is secured even when engaging a close-by passenger PC halfway of inflation. On the other hand, transverse width of the communication port is narrowed by the inner joined portions 90 and 91 extending toward transverse center of the upper wall 29 from the left and right edges 29b and 29c in the upper wall 29. Accordingly, when the airbag 10C is completely inflated, the edge 41 of the terminal portion 40 of the downstream side base cloth 39 is pressed onto the terminal portion 36 of the upstream side base cloth 35 by the wind shield W, so that a closed condition of the communication port 46 is stably secured, too.

Especially, in the airbag 10C, the distance LCT between the leading ends 90a and 91a of the left and right inner joined portions 90 and 91 is 200 mm, which is in a range of 100 to 300 mm, in a condition that the upper wall 29 is flatly developed. The lap amount LRC in front-rear direction between the transverse center or the front end 88a of the recess 88 (also equals to the edge center 37a) in the terminal portion 36 of the upstream side base cloth 35, and the transverse center 41a of the edge 41 in the terminal portion 40 of the downstream side base cloth 39 is 50 mm, which is in a range of 30 to 200 mm, in a condition that the upper wall 29 is flatly developed. This construction allows the airbag 10C to secure an enough opening area of the communication port 46 for exhausting inflation gas G smoothly when engaging the close-by passenger PC halfway of inflation, and also allows the airbag 1C to secure stable closed condition of the communication port 46 when completely inflated.

More specifically, if the distance LCT between the leading ends 90a and 91a of the left and right inner joined portions 90 and 91 is less than 100 mm, when the upper wall 29 is flatly developed, an enough opening area of the communication port 46 for smooth exhaustion of inflation gas G is hard to secure when the airbag engages the close-by passenger PC halfway of inflation, especially when the lap amount LRC is great. If the distance LCT surpasses 300 mm, the stable closed condition of the communication port 46 is hard to secure from airbag to airbag, especially when the lap amount LRC is small. Meanwhile, if the lap amount LRC of the upstream and downstream side base cloths 35 and 39 in front-rear direction is less than 30 mm when the upper wall 29 is flatly developed, the stable closed condition of the communication port 46 is hard to secure from airbag to airbag, especially when the distance LCT between the leading ends 90a and 91a of the left and right inner joined portions 90 and 91 is great. If the lap amount LRC surpasses 200 mm, an enough opening area of the communication port 46 for smooth exhaustion of inflation gas G is hard to secure upon engaging the close-by passenger PC halfway of inflation, especially when the distance LCT is shall.

Figure 32:
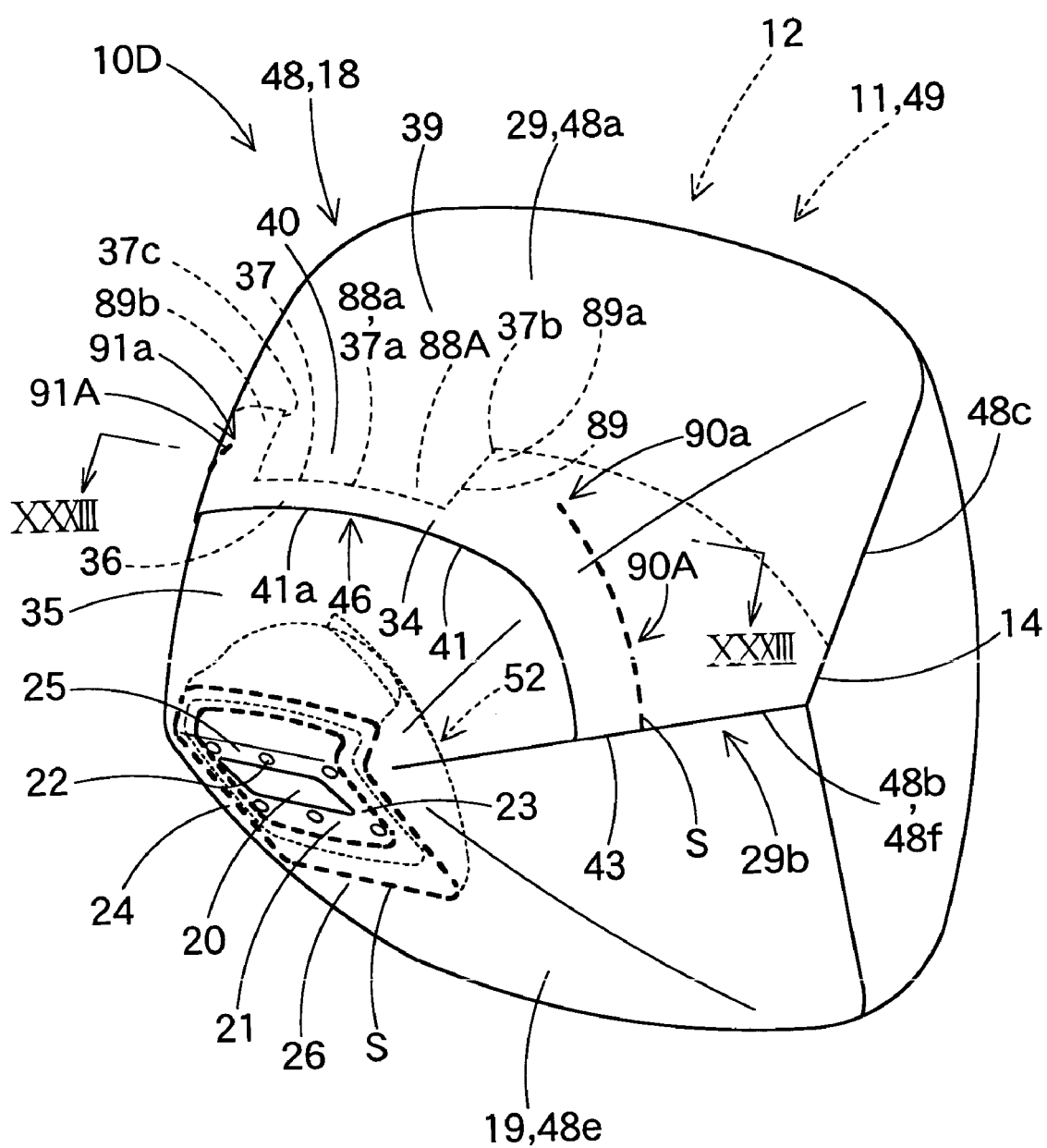
FIG. 32 is a perspective view of yet another embodiment of the airbag of the present invention.
Figure 33:
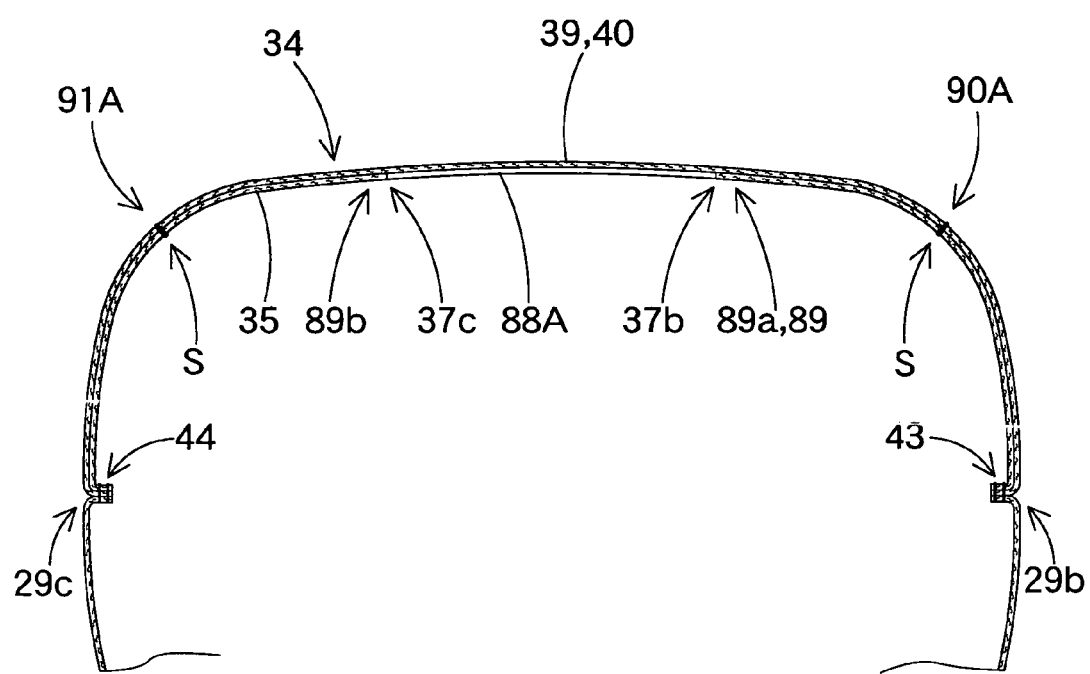
FIG. 33 is a partial section of the airbag of FIG. 32, taken along line XXXIII-XXXIII of FIG. 32.
Figure 34:
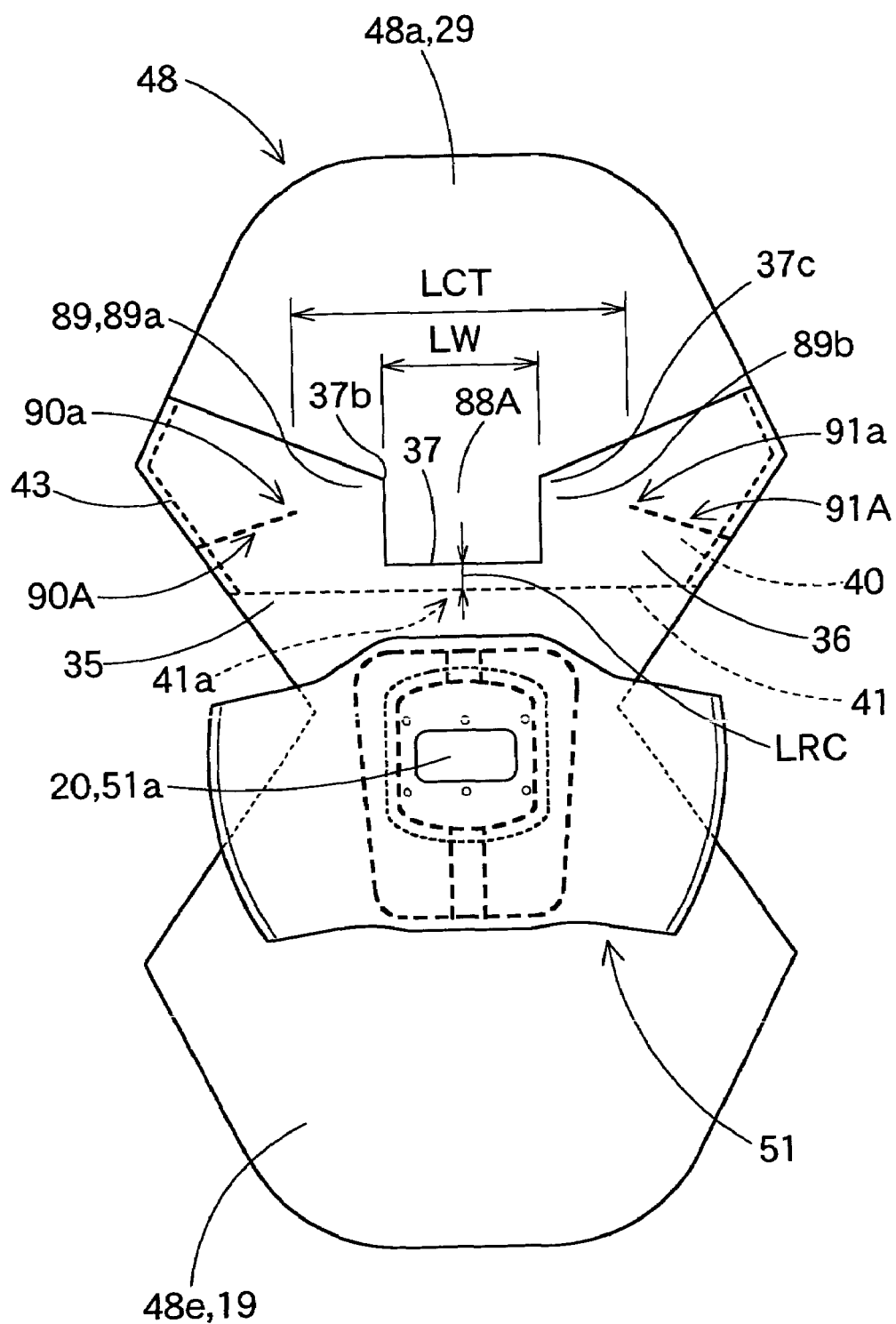
FIG. 34 is a development of the airbag of FIG. 32 under manufacture.

A shape of the recess formed in the edge center of the terminal portion of the upstream side base cloth should not be limited to a generally semicircular shape, but the recess may be formed into a polygonal shape such as rectangular shape, trapezoid shape or the like. An airbag 10D illustrated in FIGS. 32 to 34 has a recess 88A having a rectangular shape, in the center 37a of the edge 37.

The airbag 10D also includes inner joined portions 90A and 91A each of which is formed by sewing work with sewing yarn S at the same time as the outer joined portions 43 and 44, and extends toward transverse center. Leading end 90a/91a of the left/right inner joined portion 90A/91A is not so extended as to contact the recess 88A formed in the edge 37 of the upstream side base cloth 35. Moreover, as to positions in front-rear direction of the airbag 10D in a condition that the upper wall 29 of the cylindrical wall 18 is flatly developed, the leading end 90a/91a is located rearward than the front end 88a of the recess 88A, and within areas of left and right positions 89a and 89b in the recess periphery 89, the area ranging in front-rear direction.

In this airbag 10D, too, moreover, a distance LCT between the leading ends or inner ends 90a and 91a of the left and right inner joined portions 90A and 91A is 200 mm, which is in a range of 100 to 300 mm, in a condition that the upper wall 29 is flatly developed. A lap amount LRC in front-rear direction between a transverse center 88a of the recess 88A (also equals to an edge center 37a) in the terminal portion 36 of the upstream side base cloth 35, and a transverse center 41a of an edge 41 in the terminal portion 40 of the downstream side base cloth 39 is 50 mm, which is in a range of 30 to 200 mm, in a condition that the upper wall 29 is flatly developed.

Furthermore, a transverse width LW of the recess 88A of the airbag 10D is 100 mm, which is about 30 percent of the distance LCT between the leading ends 90a and 91a.

The airbag 10D obtains similar working effects as the airbag 10C.

Although the foregoing embodiments has been described as applied to an airbag employed in an airbag device for front passenger's seat, the airbag according to the present invention is also applicable to airbags targeting vehicle occupants including drivers for protection, such as an airbag for an airbag device for driver's seat or a side impact airbag device, which are mountable on a steering wheel or on a seat, and further applicable to an airbag deploying on outer surface of vehicle for protecting a pedestrian.

What is claimed is:

1. An airbag as part of an airbag device mountable on vehicle, the airbag developing and inflating with inflation gas from folded and housed state for protecting a target object of protection with cushioning property thereof when contacting with the target object, the airbag comprising:
   a bag-shaped circumferential wall;
   an upstream side base cloth as constituent part of the circumferential wall, the upstream side base cloth being located in upstream side of inflation gas;
   a downstream side base cloth as constituent part of the circumferential wall, the downstream side base cloth being located in downstream side of inflation gas; and
   a lap portion formed by superposing a terminal portion of the downstream side base cloth on a terminal portion of the upstream side base cloth, and by joining the terminal portions to each other at both ends of the terminal portions in a direction extending along edges of the terminal portions, whereby the terminal portion of the upstream side base cloth is masked from surface of the airbag, wherein:
   the lap portion comprises a communication port between joined portions of the upstream side base cloth and the downstream side base cloth and between the terminal portions of the upstream side base cloth and the downstream side base cloth, the port communicating inside and outside of the airbag, whereby:
   in the course of unfolding and inflation of the airbag, the inflation gas flowing toward the downstream side base cloth from the upstream side base cloth in the lap portion sucks air into the airbag from outside via the communication port; and
   when the airbag bumps against a target object of protection halfway of inflation, inflation gas is exhausted out of the airbag via the communication port; and
   when the airbag is completely inflated, the communication port is closed with the terminal portions of the upstream side and downstream side base cloths contacted with each other.

2. The airbag according to claim 1, wherein the lap portion is located in a position of the airbag apart from an area to contact with a target object of protection.

3. The airbag according to claim 2, wherein:
   the airbag comprises a recipient wall to contact with a target object of protection for protecting the same upon airbag inflation, in an end face of the circumferential wall which is in a stream terminal of inflation gas; and
   the lap portion is located in a portion of the airbag circumferential wall in upperstream side of inflation gas than an outer circumference of the recipient wall, and each of the edges of the terminal portions of the upstream and the downstream side base cloths is arranged generally in parallel with a plane of the recipient wall in an airbag's completely inflated condition.

4. The airbag according to claim 1, further comprising:
an inlet port for inflation gas, the inlet port being located in stream origin of inflation gas; and
a flow regulating cloth for redirecting inflation gas flown in the airbag from the inlet port, whereby inflation gas flows toward the downstream side base cloth from the upstream side base cloth in the lap portion.

5. The airbag according to claim 2, the airbag being employed in an airbag device for front passenger's seat mountable in an instrument panel in front of front passenger's seat, for protecting a front passenger as target object of protection, and the airbag comprising:
a passenger side wall deployed generally vertically at rear side of the airbag upon airbag inflation, and contacting with the passenger for protecting the same; and
a cylindrical wall deployed between a front wind shield and a top face of the instrument panel upon airbag inflation, in a manner converging forward from outer circumference of the passenger side wall, the cylindrical wall having an inlet port for inflation gas in the vicinity of front end of a lower wall thereof, wherein:
in an airbag's completely inflated condition, each of the edges of the terminal portions of the upstream and the downstream side base cloths is arranged in generally left-right direction of the airbag;
the edge of the terminal portion of the downstream side base cloth is located forward of the edge of the terminal portion of the upstream side base cloth; and
the lap portion is located in a portion to contact the wind shield in an upper wall of the cylindrical wall.

6. The airbag according to claim 5, wherein, in a folding process of the airbag, a lower edge vicinity part of the passenger side wall is roll-folded toward the inlet port in a lower side of the lower wall of the cylindrical wall.

7. The airbag according to claim 5, wherein the edges of the terminal portions of the upstream and downstream side base cloths in the lap portion extend along generally left-right direction of the airbag completely inflated, up to the vicinity of left and right edges of the upper wall extending downward.

8. The airbag according to claim 5, wherein the lap portion comprises two joined portions in each of left and right sides of the terminal portions in a direction extending along the edges of the terminal portions of the upstream and downstream side base cloths, the two joined portions being arranged side by side in generally left-right direction.

9. The airbag according to claim 5, wherein the lap portion comprises a tuck in the edge of the terminal portion of the upstream side base cloth,
whereby a transverse length of the terminal portion of the upstream side base cloth is reduced, and closing of the communication port by that the terminal portions of the upstream and downstream side base cloths contact each other is facilitated when the lap portion contacts with the windshield.

10. The airbag according to claim 5, wherein the lap portion comprises a recess in the vicinity of transverse center of the edge of the terminal portion of the upstream side base cloth, an edge center of the recess being located forward than left and right edges of the recess,
whereby closing of the communication port by that the terminal portions of the upstream and downstream side base cloths contact each other is facilitated when the lap portion contacts with the windshield.

11. The airbag according to claim 10, wherein:
the lap portion comprises an outer joined portion and an inner joined portion in each of left and right sides of the terminal portions in a direction extending along the edges of the terminal portions of the upstream and downstream side base cloths, the outer joined portions being located in left and right edge vicinities of the upper wall of the cylindrical wall, respectively, and the inner joined portions extending toward transverse center from left and right edges of the upper wall of the cylindrical wall, respectively; and
inner ends of the left and right inner joined portions do not contact with the recess, and are located rearward than the front end of the recess with respect to positions in front-rear direction of the airbag in a condition that the upper wall of the cylindrical wall is flatly developed.

12. The airbag according to claim 11, wherein:
a distance between the inner ends of the left and right inner joined portions is in a range of 100 to 300 mm, in a condition that the upper wall of the cylindrical wall is flatly developed; and
a lap amount, in front-rear direction of vehicle, of the terminal portions of the upstream and downstream side base cloths between the front end of the recess and the edge of the terminal portion of the downstream side base cloth is in a range of 30 to 200 mm, in a condition that the upper wall of the cylindrical wall is flatly developed.

* * * * *